United States Patent
Chou et al.

(10) Patent No.: US 6,770,849 B2
(45) Date of Patent: Aug. 3, 2004

(54) TABLE-TOP ELECTRIC HEAT SEALER

(75) Inventors: Shu-Hui Chou, Hsi Chih (TW); Richard Chang, Hsi Chih (TW)

(73) Assignee: Welcome Co., Ltd. (TW)

(*) Notice: Subject to any disclaimer, the term of this patent is extended or adjusted under 35 U.S.C. 154(b) by 0 days.

(21) Appl. No.: 10/072,293

(22) Filed: Feb. 7, 2002

(65) Prior Publication Data

US 2002/0070206 A1 Jun. 13, 2002

Related U.S. Application Data

(63) Continuation-in-part of application No. 09/495,999, filed on Feb. 1, 2000, now Pat. No. 6,335,515, and a continuation-in-part of application No. 09/208,256, filed on Dec. 9, 1998, now Pat. No. 6,326,594, said application No. 09/495,999, is a continuation-in-part of application No. 09/189,359, filed on Nov. 9, 1998, now Pat. No. 6,232,579, which is a continuation-in-part of application No. 08/917,358, filed on Aug. 26, 1997, now Pat. No. 5,854,466, said application No. 09/208,256.

(51) Int. Cl.[7] ................................................ H05B 1/00
(52) U.S. Cl. ........................ 219/243; 219/227; 219/233
(58) Field of Search .............................. 219/243, 227, 219/233, 229, 221, 201, 240, 241, 524, 535, 544; 156/579, 515, 583.1, 583.2, 583.4, 583.8, 583.9, 379.6, 499; 206/459.5; 248/251, 220.42, 220.43, 220.1; 220/481

(56) References Cited

U.S. PATENT DOCUMENTS

| 2,535,171 | A |   | 12/1950 | Sundstrom |
| 3,624,349 | A |   | 11/1971 | Mayer ........................ 219/243 |
| 5,142,123 | A |   | 8/1992  | Chou ......................... 219/243 |
| 5,857,577 | A | * | 1/1999  | Thomas et al. .......... 211/94.01 |

* cited by examiner

*Primary Examiner*—Quang T. Van
(74) *Attorney, Agent, or Firm*—Jeffer, Mangels, Butler & Marmaro LLP

(57) ABSTRACT

An electric heat sealer having a casing including a first pair of extensions extending outwardly therefrom, a press bar pivotally connected to said casing, the press bar including a second pair of extensions extending outwardly therefrom, at least one sealing mechanism mounted in the press bar or the casing; wherein the at least one sealing mechanism including a heating wire. The press bar is normally biased above the casing, which includes a source of current for energizing the heating wire.

21 Claims, 19 Drawing Sheets

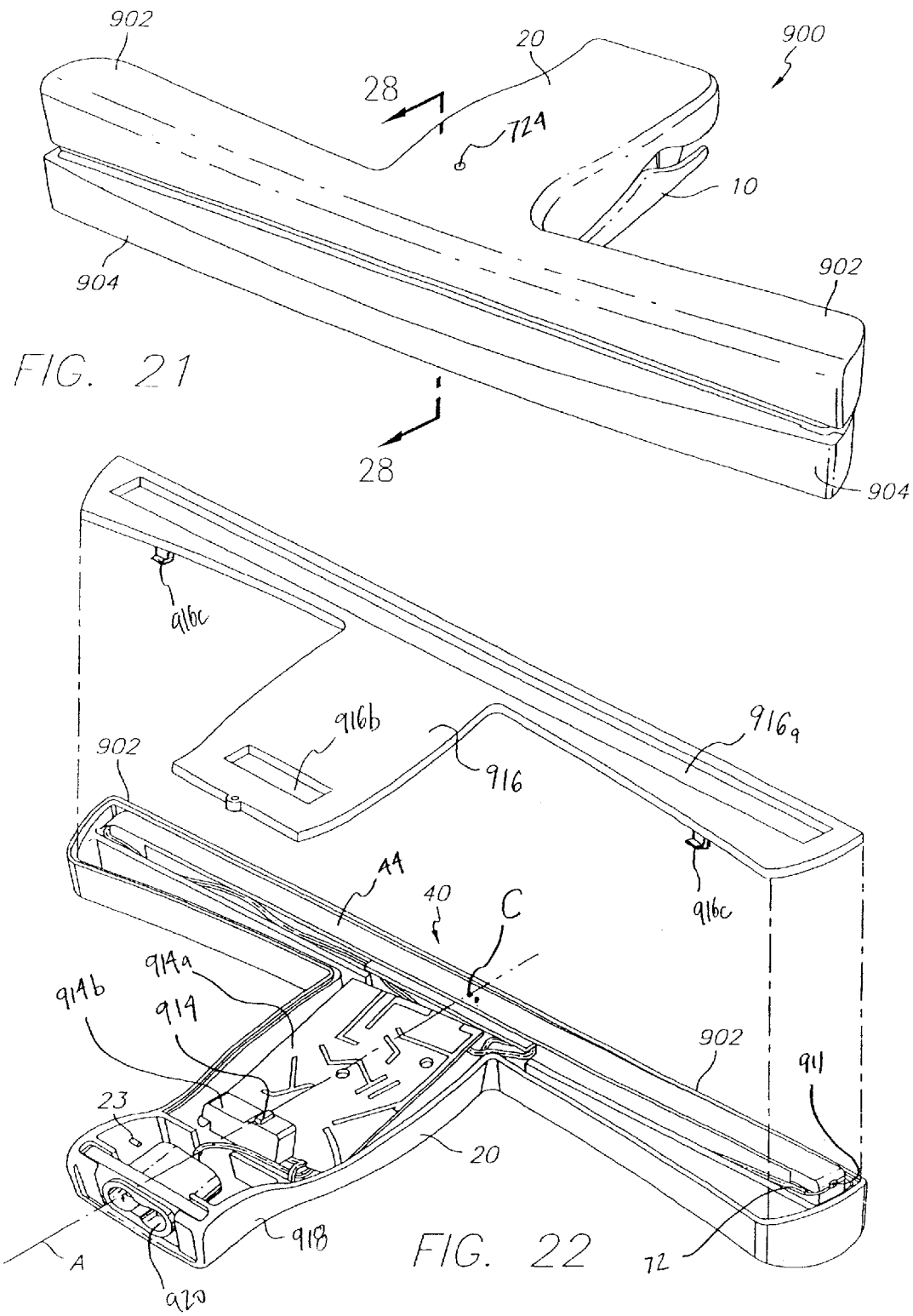

TABLE-TOP ELECTRIC HEAT SEALER

This is a continuation-in-part of U.S. patent application Ser. No. 09/495,999, filed Feb. 1, 2000, now U.S. Pat. No. 6,335,515 and 09/208,256, filed Dec. 9, 1998 now U.S. Pat. No. 6,326,594, both of which are continuations-in-part of U.S. patent application Ser. No. 09/189,359, filed Nov. 9, 1998, now U.S. Pat. No. 6,232,579, which is a continuation-in-part of U.S. patent application Ser. No. 08/917,358 filed on Aug. 26, 1997, now U.S. Pat. No. 5,854,466, the disclosures of which are incorporated in their entireties herein by reference.

FIELD OF THE INVENTION

The present invention relates to an electric heat sealer, and more particularly to an electric heat sealer which can be controlled to break the electric circuit when the apparatus is not in use, so as to prevent an electric connection by a false action.

BACKGROUND OF THE INVENTION

A variety of electric heat sealers have been developed for home use, and have appeared on the market.

Conventional electric heat sealers are functional for sealing plastic bags and the like. However, these electric heat sealers have no safety control means. When an electric heat sealer is touched by an external force, the sealing mechanism may be electrically connected to produce heat, potentially causing an accident to occur.

Another problem with conventional electric heat sealers is that it is often necessary to take two "swipes" at a plastic bag to seal the bag with the sealer. For example, when sealing a bag by swiping from the left to the right, because of the configuration of the sealer, the left most portion of the bag is often left unsealed. It is then necessary to seal the unsealed area by swiping that portion from the right to the left.

A need exists for an electric heat sealer which eliminates the aforesaid problems, and which is handy and safe in use.

SUMMARY OF THE PREFERRED EMBODIMENTS

In accordance with one preferred aspect of the present invention, there is provided an electric heat sealer comprising a casing, a battery chamber, a spring holder, a sealing mechanism, a press bar, and a safety device. The casing holds the battery chamber, the spring holder, the sealing mechanism and the safety device on the inside. The battery chamber comprises a front upright support; a rear upright support; a first front terminal plate and a second front terminal plate respectively mounted on the front upright support; a pair of rear terminal plates respectively mounted on the rear upright support; a first metal contact plate mounted on the front upright support and connected the first front terminal plate; and a second metal contact plate mounted on the front upright support and spaced from the second terminal plate by a gap. The second terminal plate is forced into contact with the second metal contact plate when a battery set is installed in the battery chamber. The spring holder is mounted in the casing and spaced between the first metal contact plate and the second metal contact plate. The sealing mechanism is mounted in the casing and moved up and down relative to the first and second metal contact plates.

The sealing mechanism comprises a heat insulative base; an electric wire; two metal locating plates; and a compression spring. The heat insulative base comprises a protrusive middle portion. The electric heating wire is mounted on the protrusive middle portion of the heat insulative base. The metal locating plates are fixedly fastened to the heat insulative base at two opposite sides and respectively connected to two opposite ends of the electric heating wire. The compression spring is connected between the spring holder and the protrusive middle position of the heat insulative base.

The press bar has a fixed end pivotally connected to one end of the casing and a free and fixedly mounted with a heat insulative press block. The heat insulative press block is forced against the protrusive middle portion of the heat insulative base of the sealing mechanism when the press bar is depressed.

The safety device comprises a safety switch with two opposite terminals. The safety switch has two lead wires respectively extended from the two opposite terminals thereof and respectively connected to the second terminal plate and the second metal contact plate.

In a preferred embodiment, the inventive electric heat sealer further includes a protective frame pivotally connected to the casing and pivotable between a first position and a second position. In the first position, the protective frame is spaced between the heat insulative base of the sealing mechanism and the heat insulative press block of the press bar. In the second position, the protective frame is pivoted out of the space between the base and the press block.

Preferably, the electric heat sealing wire and the press block are covered by heat insulative sheets, which preferably are comprised of a heat-resistant material such as a Teflon mesh.

In another preferred embodiment, the inventive heat sealer further includes a cover device for the casing. The cover device has defined therein an opening through which the protrusive middle portion of the heat insulative base of the sealing mechanism extends out of the casing. More specifically, the cover device includes a front cover plate disposed on a front portion of the casing, a rear cover plate disposed on a rear portion of the casing, and an intermediate cover plate disposed on a middle portion of the casing over the battery chamber.

In accordance with another aspect of the present invention, there is provided an electric heat sealer which includes a casing; a cover device; first and second metal contact plates; a sealing mechanism; resilient means, such as a spring, piston or the like, biasing the sealing mechanism in an upward direction; operating means pivotally connected to the casing; and a safety device.

The cover device covers the casing and has an opening formed therethrough. The first and second metal contact plates are mounted within the casing below the opening in the cover device. The sealing mechanism is mounted in the casing and moves up and down relative to the first and second metal contact plates. The sealing mechanism includes: a heat insulative base having a protrusive middle portion; an electric heating wire mounted on the protrusive middle portion of the heat insulative base, the electric heating wire having two opposite ends; and two metal locating plates mounted on the heat insulative base and respectively connected to the opposite ends of the electric heating wire.

The resilient means biases the sealing mechanism in an upward direction so that the protrusive middle portion of the heat insulative base extends through the opening in the cover device. The operating means is pivotally connected to the casing and extends above the opening in the cover device. The operating means is movable downwardly to engage an object to be sealed which is supported on the protrusive middle portion of the heat insulative base extending through the opening and urge the heat insulative base downwardly and cause the metal locating plates to engage the metal contact plates. This causes electrical current to flow through and heat the electric heating wire when the metal contact plates are connected to a source of electrical current.

The safety device selectively prevents electrical current from flowing through the electric heating wire.

In a preferred embodiment, the inventive heat sealer is adapted to be supplied with electrical current from at least one current source selected from the group consisting of a DC current source and an AC current source. Particularly, the inventive heat sealer is adapted to be supplied with electrical current from both a DC current source and an AC current source.

More particularly, the inventive heat sealer is adapted to be supplied with electrical current from a DC current source which is a battery set. In this embodiment, the casing defines a battery chamber adapted to receive a battery set, the battery chamber including a front upright support; a rear upright support; first and second front terminal plates respectively mounted on the front upright support; a pair of rear terminal plates respectively mounted on the rear upright support; a first metal contact plate mounted on the front upright support and connected to the first front terminal plate; and a second metal contact plate mounted on the front upright support and spaced from the second terminal plate by a gap. The second terminal plate is forced into contact with the second metal contact plate when a battery set is installed in the battery chamber.

Preferably, the safety device includes a safety switch having two opposite terminals and two lead wires respectively extending from the two opposite terminals thereof and respectively connected to the foregoing second terminal plate and the second metal contact plate.

In accordance with a further aspect of the present invention, there is provided an electric heat sealer comprising: a casing having an opening formed therethrough; first and second metal contact plates mounted within the casing below the opening; a sealing mechanism as described above, the sealing mechanism being mounted in the casing and moving up and down relative to the first and second metal contact plates; resilient means biasing the sealing mechanism in an upward direction so that the protrusive middle portion of the heat insulative base extends through the opening in the casing; operating means pivotally connected to the casing and extending above the opening in the casing as described above; and a safety device which selectively prevents electrical current from flowing through the electric heating wire.

In accordance with yet another aspect of the present invention there is provided an electric heat sealer that includes a main body having a longitudinal axis, and a sealing mechanism having a center point. The center point of the sealing mechanism is offset from said longitudinal axis. In a preferred embodiment, the sealer includes an offset sealer portion, in which the sealing mechanism is disposed, extending from the main body. In another preferred embodiment the sealer includes a press bar. In this embodiment, the offset sealer portion has an upper member that extends from the press bar and a lower member, wherein said main body includes a casing, wherein said upper member extends from said press bar and said lower member extends from said casing, and said sealing mechanism is disposed in said lower member.

In accordance with yet another aspect of the present invention there is provided an electric heat sealer that includes a casing that defines a longitudinal axis and has a first offset sealer portion extending therefrom, and a sealing mechanism mounted in the first offset sealer portion. The sealing mechanism has a center point that is spaced from the longitudinal axis. In a preferred embodiment, the electric heat sealer includes a second offset sealer portion that extends from the casing in a direction substantially opposite of the first offset sealer portion.

In accordance with yet another aspect of the present invention there is provided a method of sealing comprising the steps of providing an object to be sealed and sealing the object to be sealed using a sealer wherein an offset sealer portion follows a main body portion.

In accordance with yet another aspect of the present invention there is provided a method of sealing comprising the steps of providing an electric heat sealer having an offset sealer portion with a heating wire, providing an object to be sealed positioning the sealer such that the heating wire extends over an edge of the object to be sealed, and sealing the object to be sealed with a single swipe. In a preferred embodiment, the method also includes the step of causing the sealer to apply an offset force to the object to be sealed, before swiping the sealer across the object to be sealed.

In accordance with yet another embodiment of the present invention there is provided a sealing mechanism for use with an electric heat sealer that includes a heat insulative base. The heat insulative base has at least one extension member extending from a side thereof. A channel is defined between the side and the extension member.

In accordance with yet another aspect of the present invention there is provided an electric heat sealer that includes a casing, a press bar pivotally connected to the casing, at least one sealing mechanism mounted in the press bar or the casing and a source of current for energizing the electric heating wire of the sealing mechanism. The casing and the press bar each include an extension extending outwardly therefrom.

Preferably, the extensions are substantially parallel to the longitudinal axis defined by the casing.

In accordance with another aspect of the present invention there is provided an electric heat sealer including a casing, a press bar pivotally connected to the casing, at least one sealing mechanism mounted within the casing or the press bar, the sealing mechanism including a heating wire, wherein the heating wire includes at least two sections that are non-parallel to one another, and a source of current.

In accordance with yet another aspect of the present invention there is provided a sealer wall mounting mechanism that includes a main body portion, a pair of spaced apart posts extending outwardly from the main body portion, and a pair of spaced apart hang members extending outwardly from the main body portion and spaced below the pair of spaced apart posts.

In accordance with yet another aspect of the present invention there is provided a plastic bag sealer that includes a sealing mechanism having a base and a heatable wire thereon. The base has an upper surface portion upon which the wire is positioned. The length of the wire which is adapted to contact the bag is greater than the length of the upper surface portion of the base.

In accordance with yet another aspect of the present invention there is provided an electric heat sealer including a casing, a press bar pivotally connected to the casing, at least one sealing mechanism mounted including a heating wire with a resistance of greater than about 5 ohms, and a source of current. In a preferred embodiment, the heating wire is non-circular.

In accordance with yet another aspect of the present invention there is provided a plastic bag sealer that includes a sealing mechanism having a base and a heatable wire thereon. The base has a length and an upper surface portion upon which the wire is positioned. The surface area of the wire that is adapted to contact the bag is greater than the surface area of the wire which would be adapted to contact the bag if the wire were linearly disposed along the length of the upper surface portion of the base.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which

FIG. 21 is a perspective view of a heat sealer that includes extensions for sealing a plastic bag without having to "swipe" the sealer in accordance with an embodiment of the present invention.

FIG. 22 is a perspective view of the press bar of the heat sealer of FIG. 21 with the cover exploded away to show the components disposed therein.

Like numerals refer to like parts throughout the several views of the drawings.

DETAILED DESCRIPTION OF THE PREFERRED EMBODIMENTS

Figure 1:
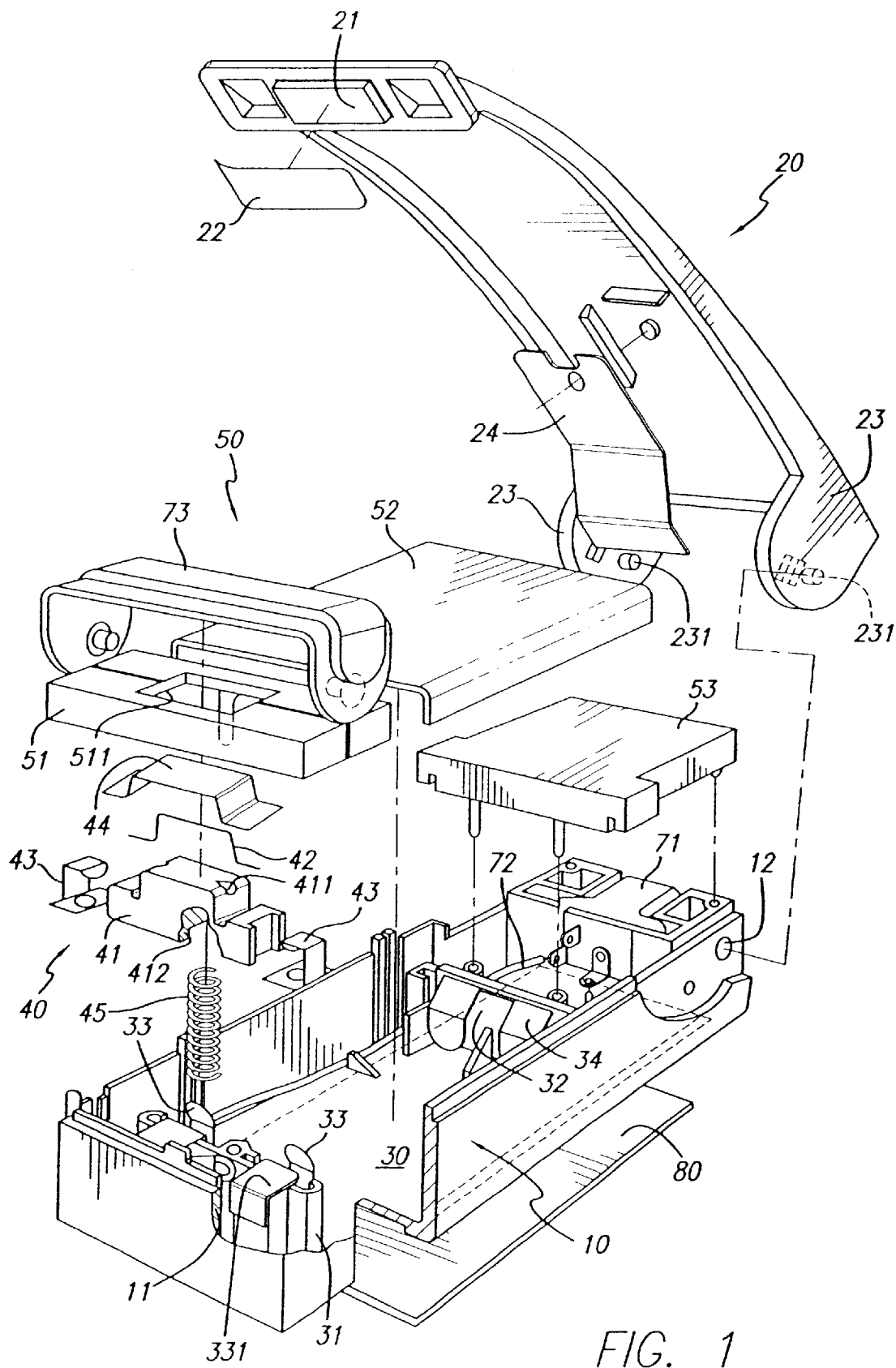
FIG. 1 is an exploded view of an electric heat sealer according to the present invention.
Figure 2:
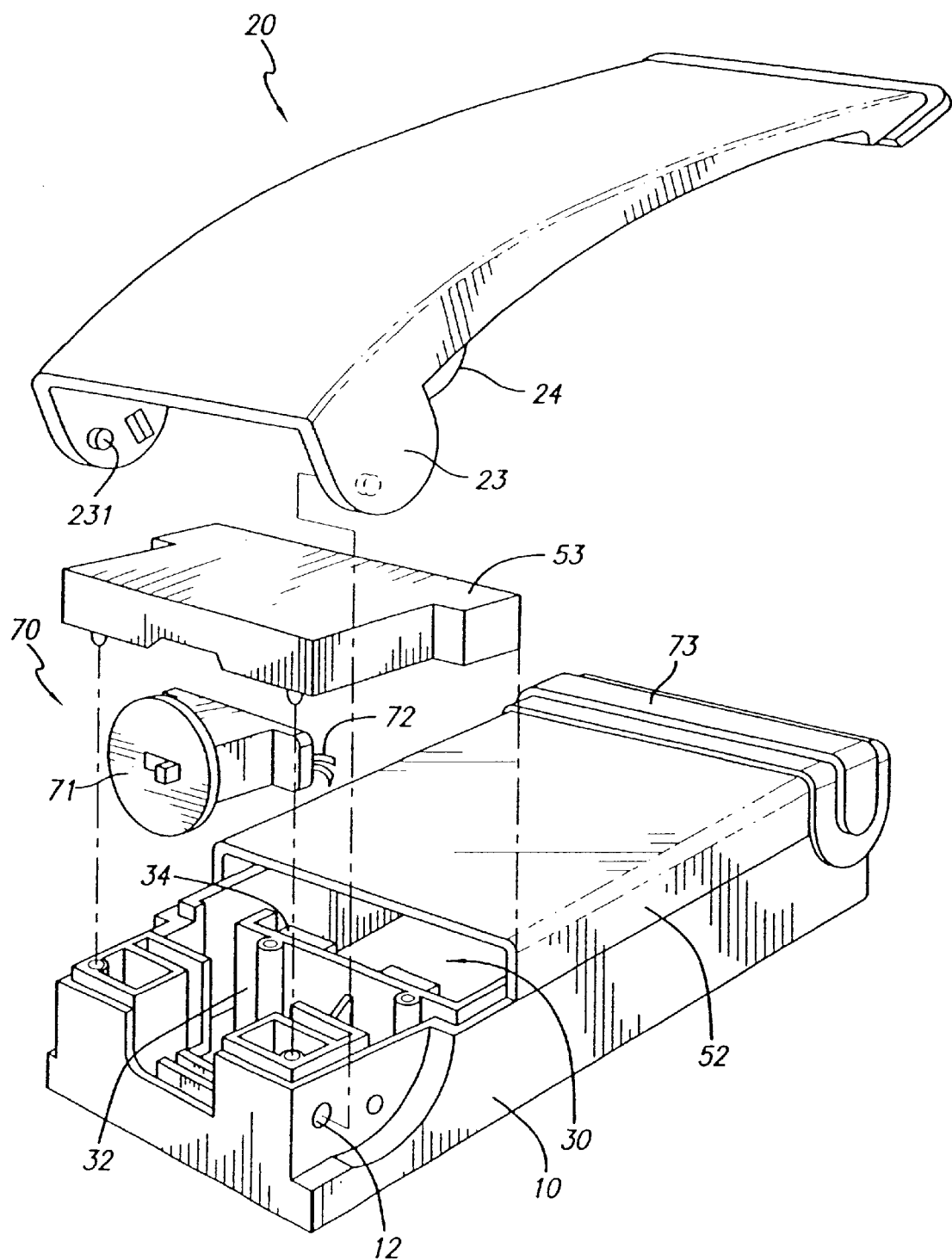
FIG. 2 is another exploded view of the present invention.
Figure 3:
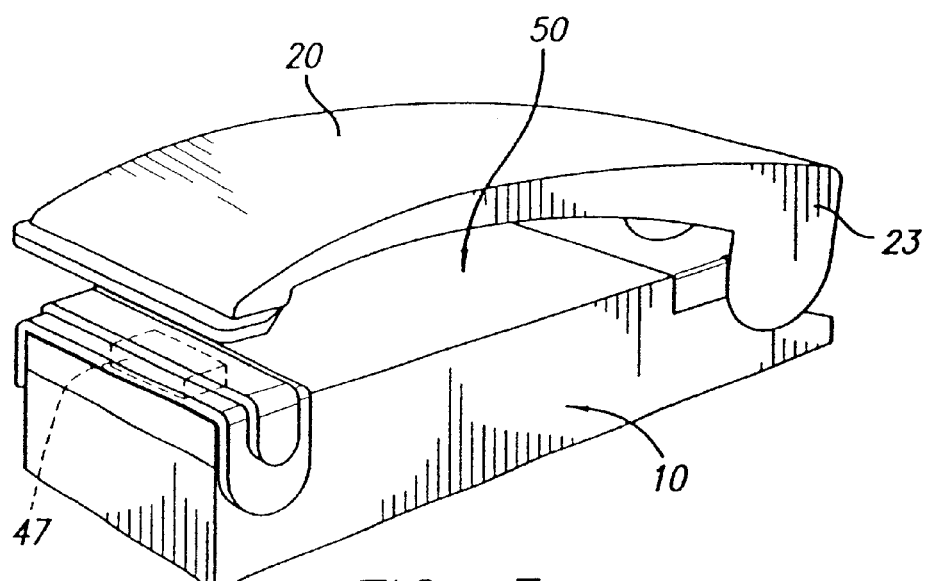
FIG. 3 is a perspective view of the present invention when viewed from the front side.
Figure 4:
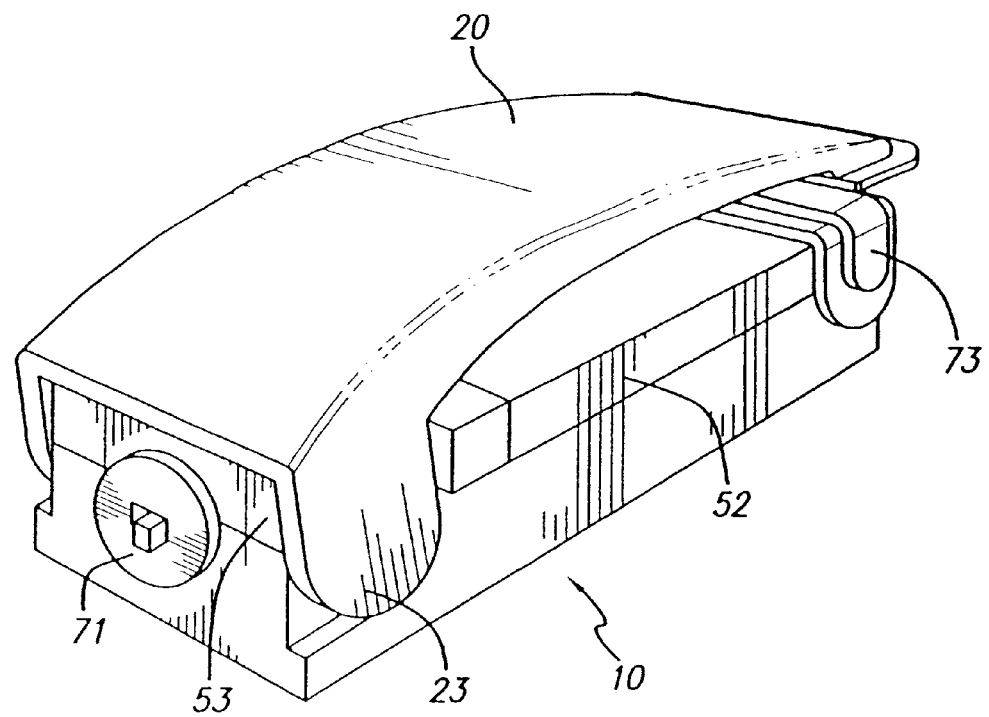
FIG. 4 is another perspective rear side view of the present invention when viewed from the rear side.

Referring to FIGS. 1–4 and 7, a first embodiment of an electric heat sealer in accordance with the present invention includes a casing 10, a spring holder 11, a press bar 20, a battery chamber 30, a sealing mechanism 40, and a safety device 70.

It will be appreciated that terms such as "below," "outwardly," "downwardly," "upwardly," "leftmost," "rightmost," "horizontal," and "vertical" used herein are used merely for ease of description and refer to the orientation of the components as shown in the Figures. It should be understood that any orientation of the various embodiments of electric heat sealers and the components thereof described herein is within the scope of the present invention.

The battery chamber 30 is defined within the casing 10. The battery chamber 30 comprises a front upright support 31, a rear upright support 32, a pair of front terminal plates 33 and a rear terminal unit having a pair of rear terminal plates 34 respectively mounted on the front upright support 31 and the rear upright support 32. When battery cells (not shown) are installed in the battery chamber 30, the positive and negative terminals of the battery cells are respectively connected to the metal contact plates 33, 34.

A pair of flat metal contact plates 331 are mounted on the front upright support 31. One flat metal contact plate 331 is directly connected to one front terminal plate 33. Alternatively, the two plates 331 and 31 can form a single unit. The other flat metal contact plate 331 is spaced from the other front terminal plate 33 by a gap 332.

The spring holder 11 is mounted in the front upright support 31 between the flat metal contact plates 331.

The sealing mechanism 40 is mounted within the casing 10, comprising a heat insulative base 41, an electric heating wire 42, two metal locating plates 43, a heat resisting cover sheet 44, and a compression spring 45. The heat insulative base 41 comprises a protrusive middle portion 411. The locating plates 43 are fasted to two opposite sides of the heat insulative base 41 to hold the electric heating wire 42 on the protrusive middle portion 411. The heat resisting cover sheet 44 is covered on the heat insulative base 41 over the electric heating wire 42 to protect the electric heating wire 42. The heat insulative cover sheet 44 preferably is a meshed member, made from a heat-resistant material such as Teflon, providing a smooth surface. The heat insulative base 41 has a bottom mounting hole 412 at the bottom of the protrusive middle portion 411. The bottom mounting hole 412 is preferably a circular hole. The compression spring 45 has a bottom end received in the spring holder 11, and a top end inserted into the bottom mounting hole 412. The diameter of the compression spring 45 fits the circular bottom mounting hole 412 of the heat insulative base 41. Because the sealing mechanism 40 is supported on the compression spring 45, it can be moved up and down in the casing 10 and is biased in the upward direction.

The press bar 20 comprises a heat insulative press block 21 at one end facing the protrusive middle portion 411 of the heat insulative base 41 of the sealing mechanism 40, a heat resisting cover sheet 22 covered on the heat insulative press block 21, and a pair of lugs 23 bilaterally disposed at an opposite end. The lugs 23 have a respective pivot pin 231 at an inner side respectively inserted into two transverse pivot holes 12 at one end of the casing 10. The heat resisting cover sheet 22 of the press bar 20 and the heat resisting cover sheet 44 of the sealing mechanism 40 are preferably made from same material, such as a Teflon mesh. Further, a spring plate 24 is provided between the press bar 20 and the casing 10 to impart an upward bias to the press bar 20. Because of the arrangement of the spring plate 24, the press bar 20 is normally maintained in an upward position to prevent direct contact between the heat resisting cover sheet 22 at the press bar 20 and the heat resisting cover sheet 44 at the sealing mechanism 40.

The safety device 70 is for open circuit protection. Safety device 70 preferably includes a safety switch 71 and a protective frame 73. In the particular embodiment illustrated in FIGS. 2 and 4, the safety switch 71 is mounted in the casing 10 at the rear thereof. Safety device 70 has two lead wires 72 respectively extending from two opposed terminals thereof and respectively connected to one front terminal plate 33 (which is not directly connected to the corresponding flat metal contact plate 331) and one flat metal contact plate 331 (which is not directly connected to the corresponding front terminal plate 33). See FIG. 8.

Figure 8:
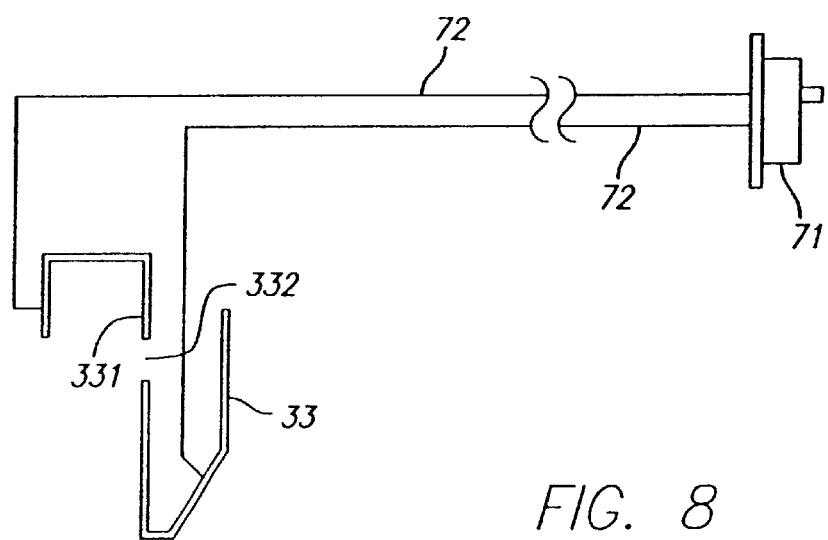
FIG. 8 is a circuit diagram showing the connection of an embodiment of a safety device of the invention (a safety switch) to the flat metal contact plate and front terminal plate of FIG. 7.

When the electric heat sealer is in use, the safety switch 71 is switched by a user to the "on" position. When the safety switch is in the "on" position, the gap 332 is bridged, enabling current to flow from terminal plate 33 to metal contact plate 331 as shown in FIG. 8. When the electric heat sealer is not in use, the safety switch 71 is switched by the user to the "off" position to keep the lead wires 72 in an open circuit state and prevent current from flowing from terminal plate 33 to contact plate 331 in FIG. 8. That is, the safety switch is a safety device that is adapted to selectively prevent electrical current from flowing through the electric heating wire. "Selectively" denotes that a user chooses a position which opens or closes the electric circuit and sets the device in the chosen position. The device remains in the selected state until the user changes the state of the device. Safety switch 71 can be a mechanical switch, an electrical device or any other device which permits selective prevention of electrical current flow.

Depressing the press bar 20 against the sealing mechanism 40 does not close the electric circuit when the safety switch 71 is set at the "off" position.

The protective frame 73 is pivotally connected to the casing 10 on the outside of the casing at the same end as the sealing mechanism 40. When the electric heat sealer is not in use, the protective frame 73 is pivoted upwards and retained between the heat insulative block 21 of the press bar 20 and the protrusive middle portion 411 of the heat insulative base 41 of the sealing mechanism 40 to stop the heat insulative block 21 from contacting the sealing mechanism 40. When in use, the protective frame 73 is pivoted outwardly and downwards to a position away from the heat insulative block 21 and the heat insulative base 41. Thus, the protective frame, by virtue of its pivotal motion between the foregoing two positions, is also adapted to selectively prevent electrical current from flowing through the electric heating wire.

Figure 5:
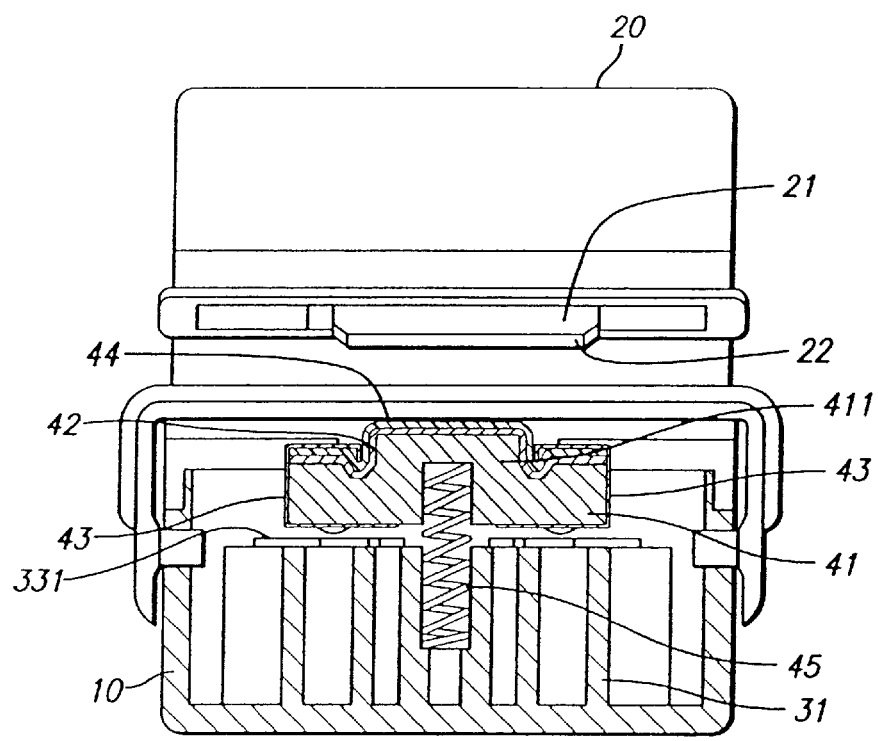
FIG. 5 is a sectional view of the present invention before operation.

Referring to FIG. 5, when the electric heat sealer is not in use, the heat insulative base 41 is biased upward by the compression spring 45 so that the locating plates 43 are spaced from the flat metal contact plates 331 to electrically disconnect the electric heating wire 42 from the battery cells. The safety switch 71 is switched to the "off" position, and the protective frame 73 is pivoted upward to the top side of the casing 10 and retained between the heat insulative press block 21 and the protrusive middle portion 411 of the heat insulative base 41 of the sealing mechanism 40. Therefore the electric heat sealer is deactivated and performs no work.

Figure 6:
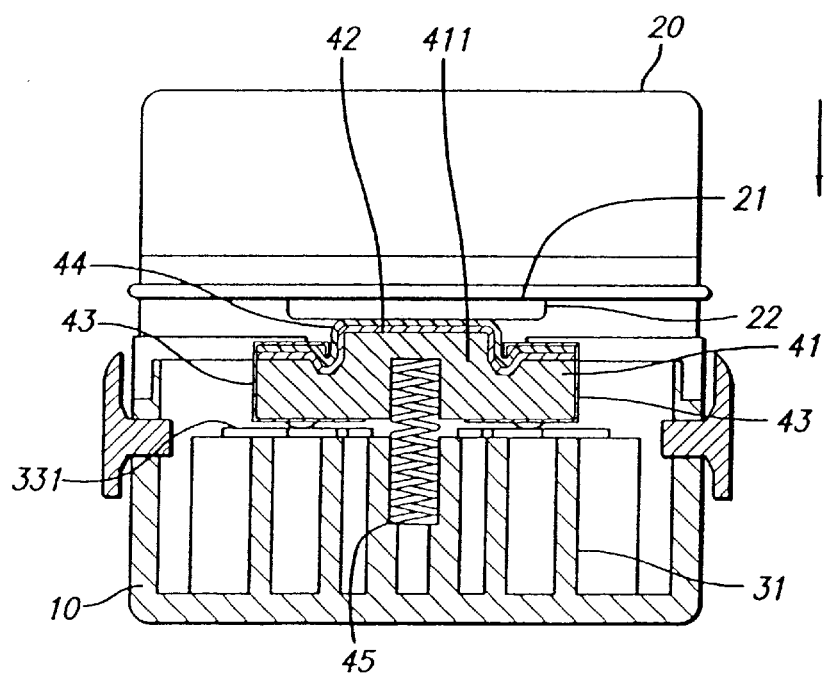
FIG. 6 is another sectional view of the present invention, showing the press bar pressed down.
Figure 7:
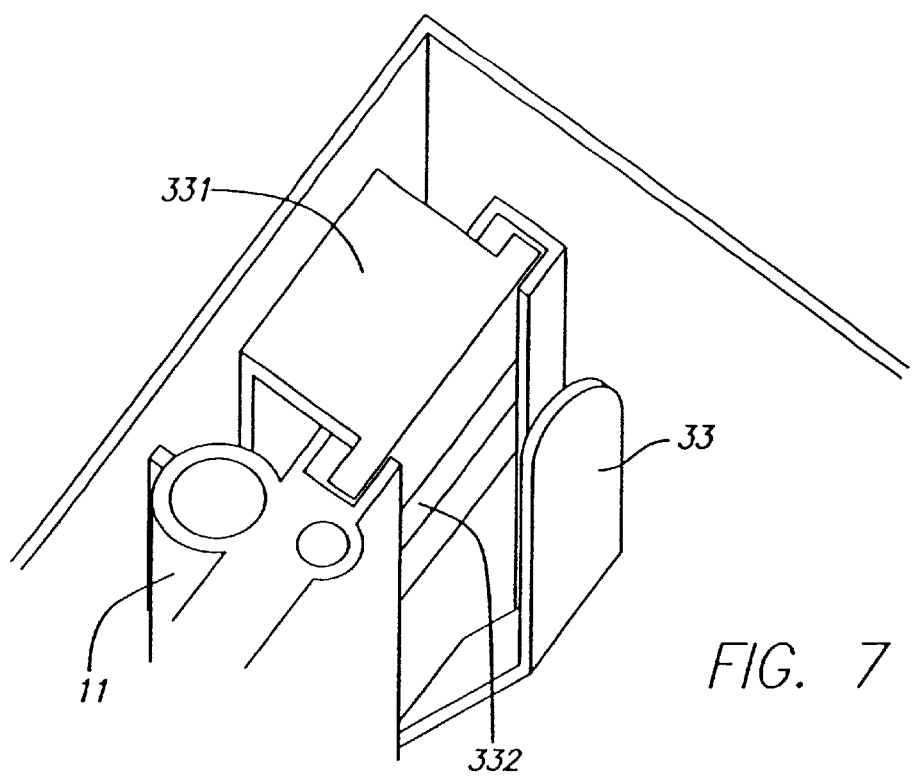
FIG. 7 is an enlarged view showing a flat metal contact plate and a front terminal plate separated by a gap.

Referring to FIG. 6, when in use, the protective frame 73 is pivoted outwardly and downwards from the position above the protrusive middle portion 411 of the heat insulative base 41 preferably to the front of the casing 10, and the safety switch 71 is switched to the "on" position to electrically connect the lead wires 72. When the press bar 20 is pressed down, the heat insulative press block 21 is forced against the heat insulative base 41. This causes the heat insulative base 41 to be lowered and forces the locating plates 43 into contact with the metal contact plates 331 to close the electrical circuit and heat the electric heating wire 42.

When sealing a workpiece, for example, a plastic bag, the open side of the plastic bag is placed between the protrusive middle portion 411 of the heat insulative base 41 and the heat insulative press block 21. Then the press bar 20 is pressed down to force the locating plates 43 into contact with the metal contact plates 331 respectively. This closes the electrical circuit, thereby causing the electric heating wire 42 to be heated. The open side of the plastic bag is thus melted and sealed by the heat produced by the electric heating wire 42. When the press bar 20 is released from the hand after use, the locating plates 43 are biased upward by the compression spring 45, along with the rest of the heat insulative base 41, from the metal contact plates 331 to open the electric circuit and prevent electrical current from the battery set from flowing through the electric heating wire 42.

In the foregoing embodiment, the inventive safety device includes both safety switch 71 and protective frame 73. If desired, either of these elements can be utilized separately.

Referring to FIG. 1 again, a cover device 50 is provided to cover the casing 10. The cover device 50 is comprised of a front cover plate 51, an intermediate cover plate 52, and a rear cover plate 53. The front cover plate 51 covers on the front portion of the casing 10 over the sealing mechanism 40. The intermediate cover plate 52 covers the middle portion of the casing 10 over the battery chamber 30. The rear cover plate 53 covers the rear portion of the casing 10. The front cover plate 51 has defined therethrough an opening 511 through which the protrusive middle portion 411 of the heat insulative base 41 extends.

Alternatively, cover device 50 can be comprised of two plates or can be formed from a single plate. That is, cover plates 51 and 52, 52 and 53, or 51–53 can be replaced with unitary structures.

Referring to FIG. 1 again, a magnetic bottom plate 80 is preferably fixedly mounted on the bottom of the casing 10. By means of the magnetic bottom plate 80, the electric heat sealer can be secured to a metal surface, for example a refrigerator door, by magnetic attraction.

Alternative embodiments of the foregoing heat sealer are also included within the scope of the present invention. In one alternative embodiment, the rear terminal unit can be replaced with two separate rear terminal plates 34 separated by a gap, and a safety switch can be connected between the plates 34 (rather than front plated 33 and 331 as described above) while the separated front plates 33 and 331 are placed in contact or form a single element.

In another alternative embodiment, electrical current can be supplied to electric heating wire 42 from an AC power source rather than a DC power source, or from both an AC power source and a DC power source. That is, the electric heat sealer can be adapted to be supplied with electrical current from at least one current source selected from an DC current source and an AC current source (including both DC and AC power sources). Exemplary alternative power sources for an electric heat sealer that can be adapted for use in the present invention are described, for example, in U.S. Pat. No. 5,142,123, which is incorporated herein in its entirety by reference. Safety switch 71 is disposed at an appropriate position in the electrical circuit between the electric heating wire and the DC and/or AC current source to selectively prevent current flow to the electric heating wire. Selection of the appropriate location for safety switch 71 in this embodiment is a matter of routine design choice for those skilled in the art.

In another alternative embodiment, the cover device 50 can be disposed on the bottom of the casing 10 rather than on the top of the casing, so that, for example, a battery set can be inserted from the bottom of the electric heat sealer. In this embodiment, if desired a magnetic bottom plate can be affixed to the cover device or a plate thereof if the cover device is comprised of multiple separate plates. In this embodiment an opening through which the protrusive middle portion 411 of the heat insulative base 41 extends is formed in an upper surface of the casing itself rather than in the cover device.

Figure 9:
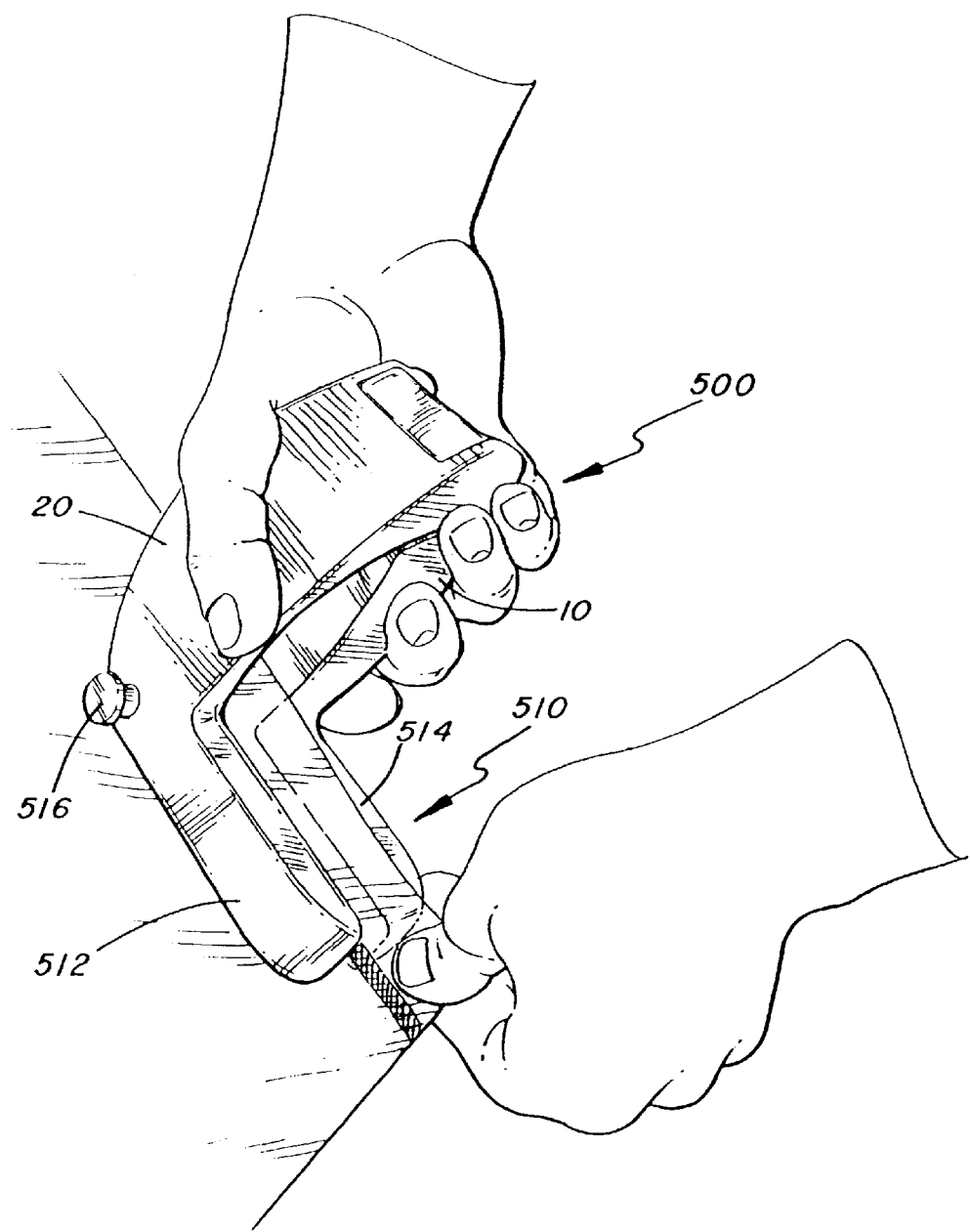
FIG. 9 is an environment view showing a heat sealer having an offset sealer portion sealing a plastic bag.
Figure 10:
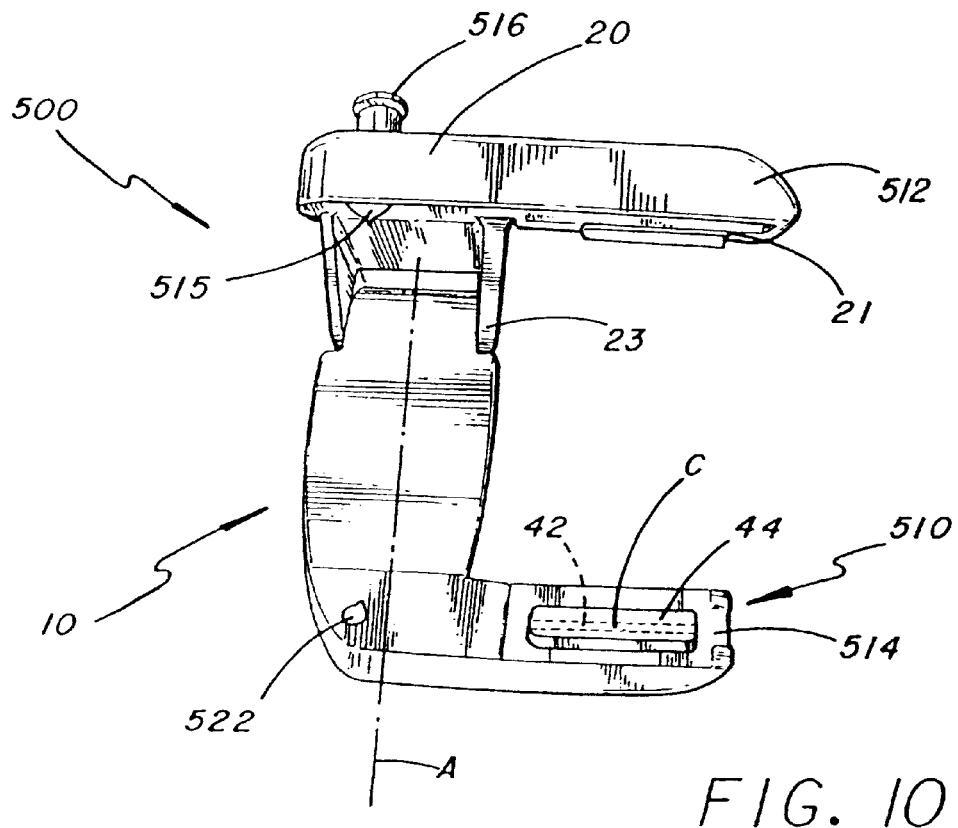
FIG. 10 is a front elevational view showing the heat sealer of FIG. 9 in an open position.
Figure 11:
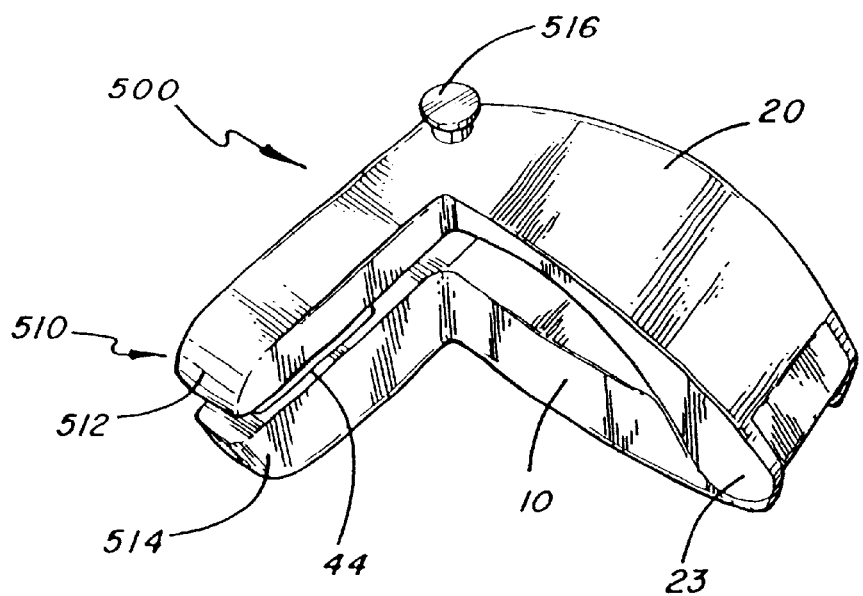
FIG. 11 is a perspective view of the heat sealer of FIG. 9.

Referring to FIGS. 9–11, an embodiment of an electric heat sealer 500 having an offset sealer portion 510 is shown.

As best shown in FIGS. 10 and 11, sealer 500 is similar to those embodiments described above. However, where the above described embodiments included a sealing mechanism 40 and associated components that are aligned with a longitudinal axis defined by casing 10, the center point C of the sealing mechanism 40 (via the offset sealing portion 510) of sealer 500 is offset from the longitudinal axis A defined by casing 10.

An upper member 512 of the offset sealer portion 510 extends from the press bar 20, and a lower member 514 of the offset sealer portion 510 extends from the casing 10. Preferably, the offset sealer portion 510 extends in a direction substantially perpendicular to the longitudinal axis A, however, this is not a limitation on the present invention. The sealing mechanism 40 is disposed in the lower member 514 and preferably extends through an opening defined therein. It will be understood that the offset sealer portion 510 can be any desired length. Therefore, the components of the sealing mechanism 40, such as the heat insulative base 41 and the protrusive middle portion 411 thereof, electric heating wire 42 and the heat resisting cover sheet 44 can be longer than in the above described embodiments. This creates a longer sealing surface, and provides improved sealing capabilities. The heat insulative block 21 (and the heat insulative cover sheet 22) is located on the upper portion 512 and is preferably aligned with the heat insulative base 41 and the heat resisting cover sheet 44, such that when the press bar 20 is pressed, the heat insulative block 21 and the heat resisting cover sheet 44 sandwich the workpiece therebetween. The heat resisting cover sheet 44 can be removed so that the electric heating wire 42 can be replaced.

Preferably, the sealer 500 is activated automatically when the press bar 20 (and upper member 512) is pressed against the sealing mechanism 40, thereby urging the heat insulative base 41 downwardly and closing the circuit as described above. The sealer 500 can also include a safety switch 71 as described above. When the safety switch 71 is at an "off" position, the heating wire 42 cannot be activated even when the circuit is closed by urging the locating plates 43 into contact with the contact plates 331. When the safety switch 71 is in the "on" position, the heating wire 42 is energized when the circuit is closed by urging the locating plates 43 into contact with the contact plates 331. In an alternative embodiment, the electric heating wire 42 can be energized simply by switching safety switch 71 to the "on" position. In this embodiment, the heat insulative base 41 can be stationary, thereby eliminating the need for a spring, locating plates 43 or contact plates 331. Electric current can be supplied to the electric heating wire 42 of the sealer 500 by AC or DC power as described above.

As shown in FIG. 9, the offset portion 510 of the sealer 500 allows a bag to be sealed more easily with a single swipe. Thereby preventing the necessity of a second swipe as described above in the Background of the Invention.

In a preferred embodiment, the sealer 500 can also be used to open a sealed bag. Preferably the sealer 500 includes a slicer 515 that is actuated by a button 516. The button 516 extends through the upper portion 512 and is held in a first position by a spring. When the button 516 is pressed downwardly, the slicer 515, which is located on a bottom side of the upper portion 512, is urged downwardly. The sealer can include a stop plate 522 with which the slicer 515 comes in contact when the button 516 is depressed. To slice a bag or the like using the slicer 515, the user places a bag into position, as shown in FIG. 9, presses the press bar 20 downwardly, and simultaneously presses the button 516, thereby urging the slicer 515 downwardly and into contact with (and slicing through) the bag. The sealer 500 is then pulled across the bag in one motion, thereby slicing the bag open. In a preferred embodiment, the cutting portion of the slicer is made of a ceramic that easily cuts through a plastic bag, but that will not cut human skin. However, the slicer 515 can be made of metal or other cutting material.

It will be understood that other forms of slicers or cutters can be used with the present invention. For example, a safety cutting device such as that taught in U.S. Pat. No. 6,032,371, to Chou, filed Aug. 27, 1998, the entirety of which is incorporated herein by reference, can be used.

Figure 12:
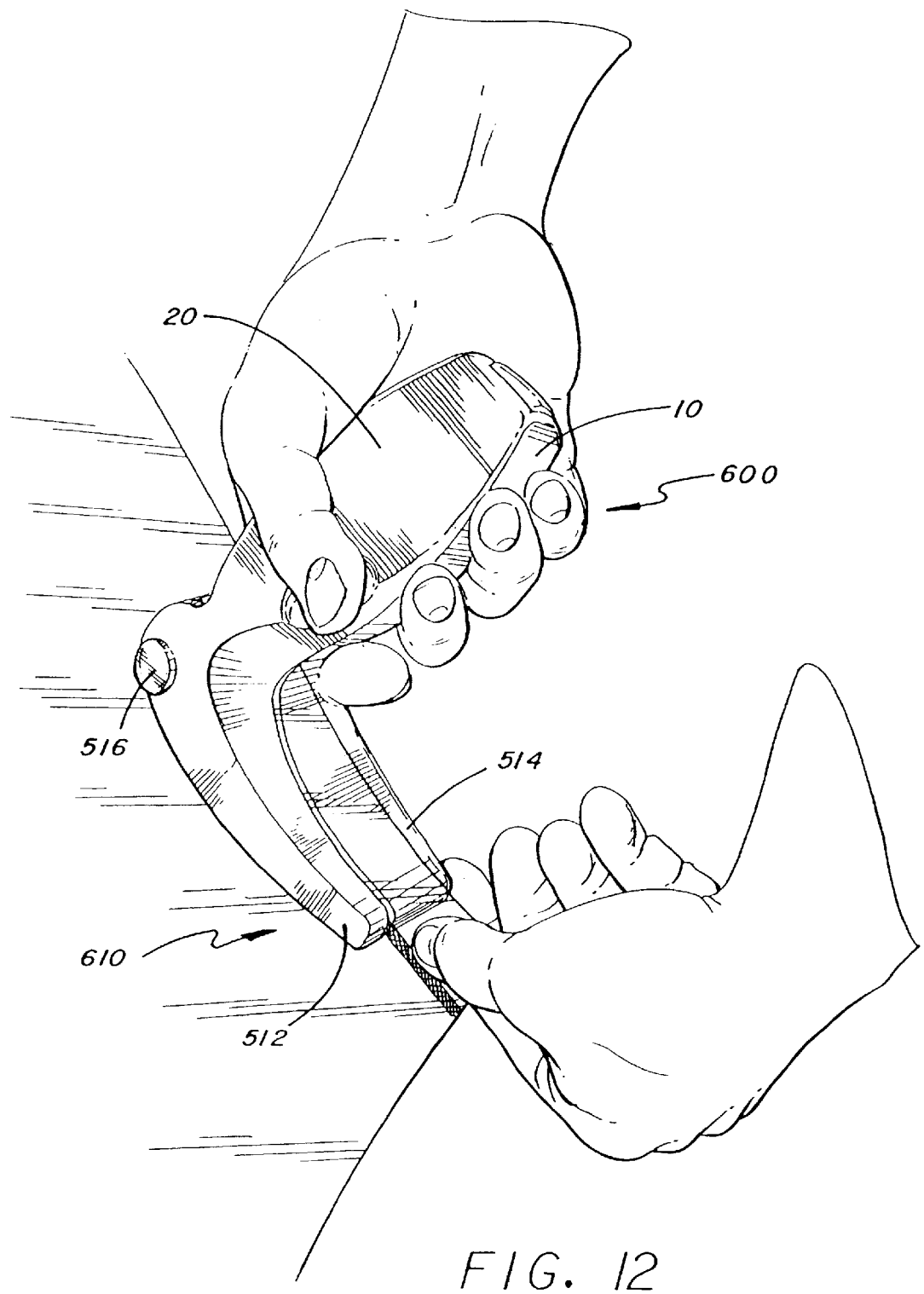
FIG. 12 is a is an environment view showing a heat sealer having an offset sealer portion similar to that of FIG. 9, but more ergonomically designed. The sealer is shown sealing a plastic bag.
Figure 13:
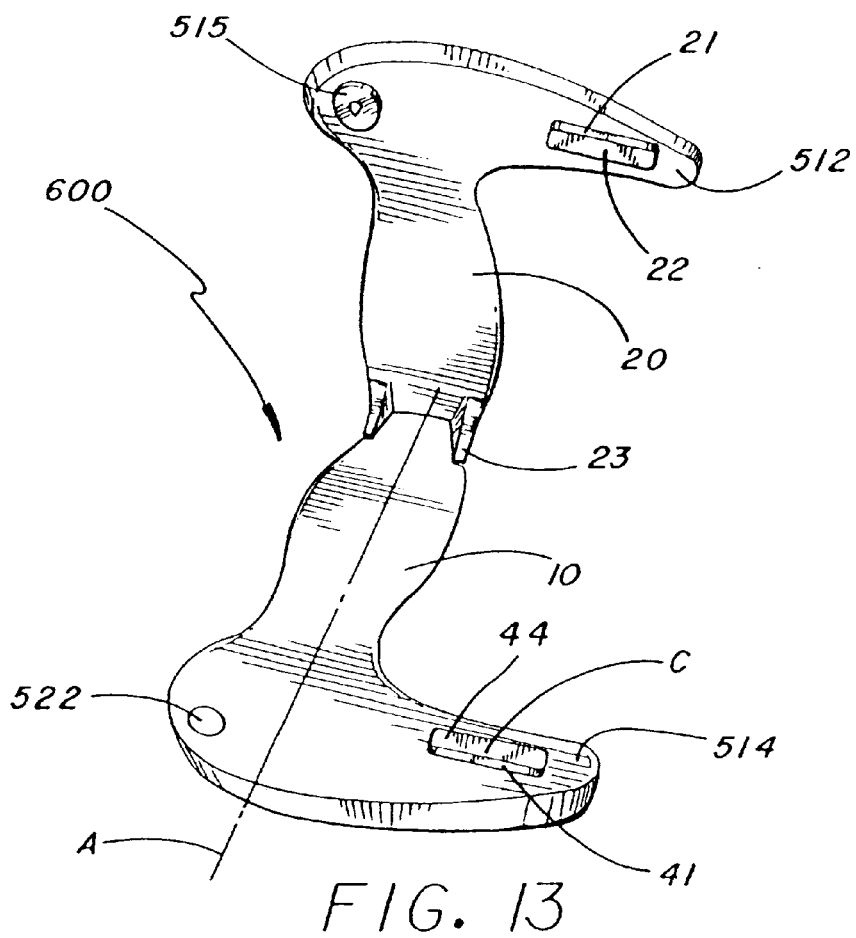
FIG. 13 is a front elevational view showing the heat sealer of FIG. 12 in an open position.
Figure 14:
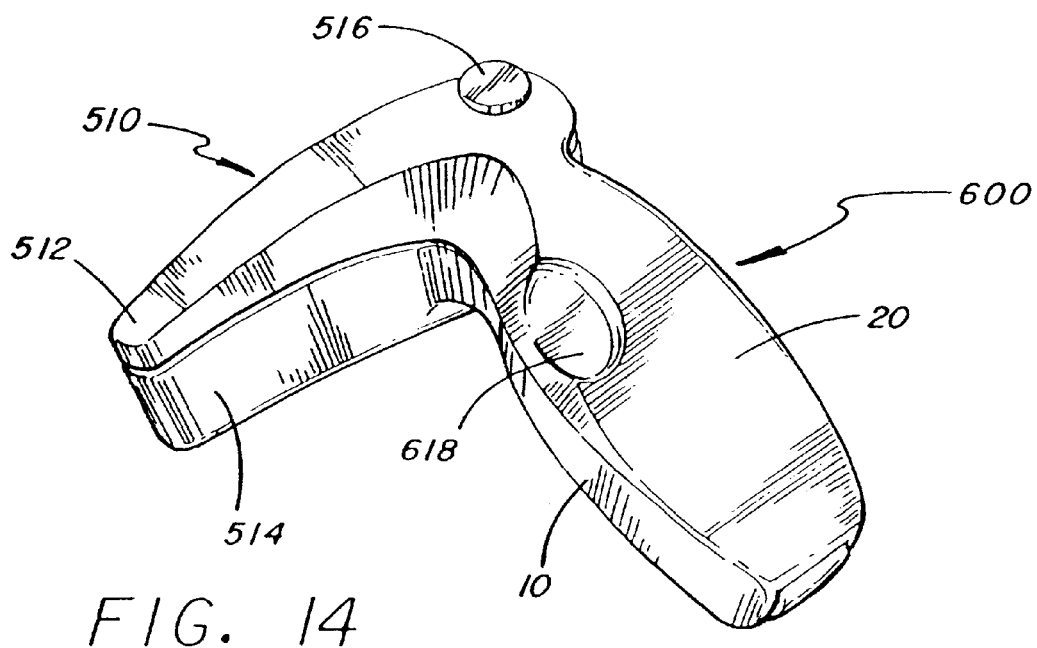
FIG. 14 is a perspective view of the heat sealer of FIG. 12.

FIGS. 12–17 show two more embodiments of electric heat sealers with an offset sealer portion 515. FIGS. 12–14 show a sealer 600 wherein the press bar 20, casing 10 and offset sealer portion 510 are designed for comfort in the hand of a user. The sealer 600 can be provided with a thumb depression 618 for ease of depressing the press bar 20. The working components of the sealer 600 are similar to those of the above described embodiments.

Figure 15:
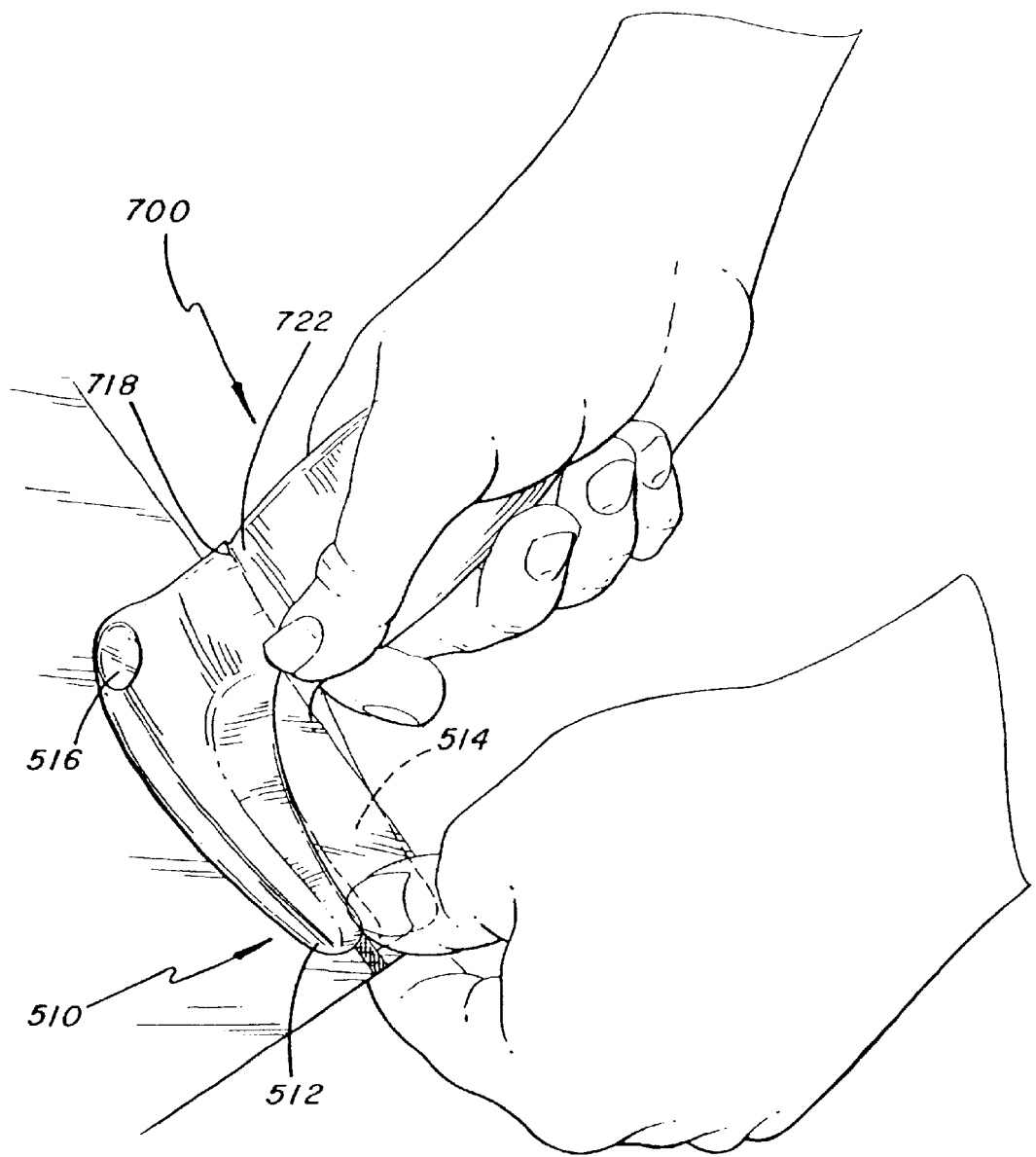
FIG. 15 is an environment view showing a heat sealer having an offset sealer portion similar to that of FIG. 12, but having the press bar pivotally connected to the casing at a neck portion. The sealer is shown sealing a plastic bag.
Figure 16:
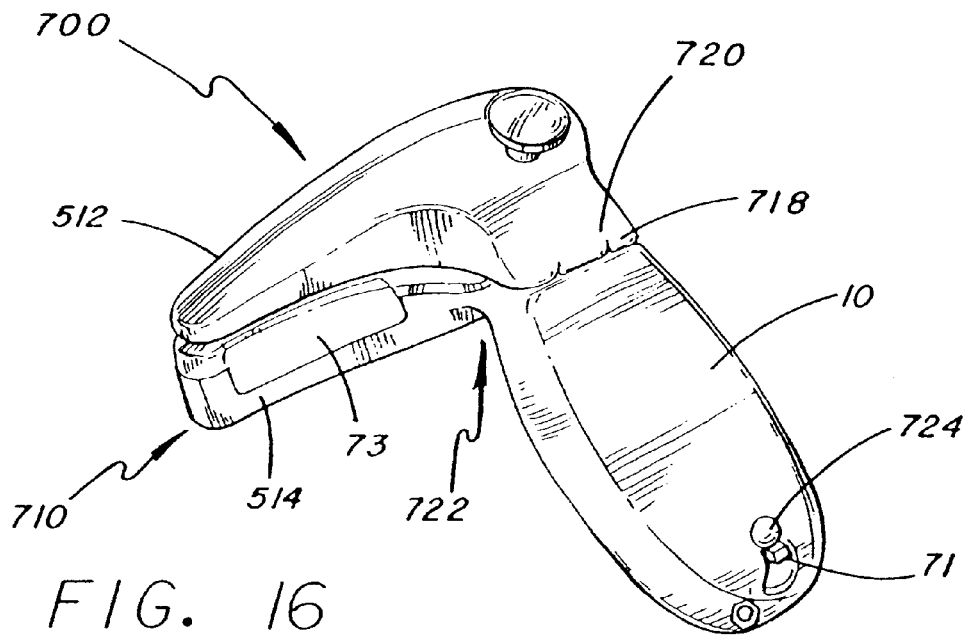
FIG. 16 is a front elevational view showing the heat sealer of FIG. 15 in an open position.
Figure 17:
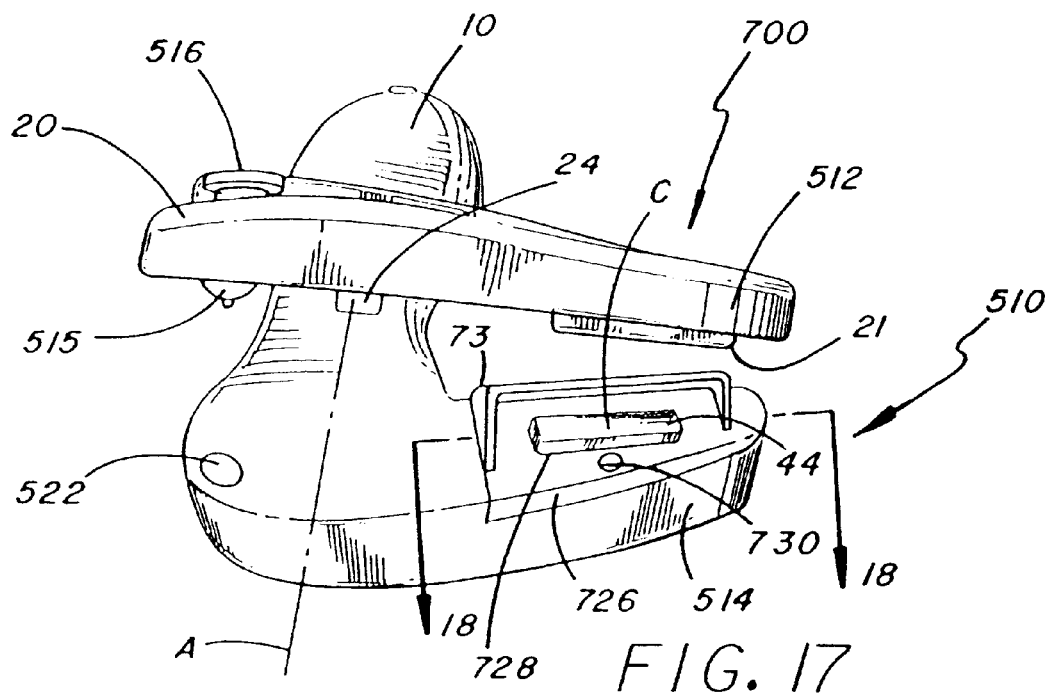
FIG. 17 is a perspective view of the heat sealer of FIG. 15.

FIGS. 15–17 show another sealer 700 having an offset sealer portion 510. Sealer 700 has a press bar 720 and upper member 512 of the offset sealer portion 510 that are pivotally connected via a hinge 718 to the casing 10 at a neck portion 722 of the casing 10. As can be seen in the figures, the casing 10 acts as a handle. The sealer 700 can also include an LED 724 that indicates when the circuit is opened and closed or that indicates if the battery has power or is "dead." As will be appreciated by those skilled in the art, the above described embodiments of electric heat sealers with offset sealer portions are constructed substantially the same as the sealers described above and shown in FIGS. 1–8, except that the sealing components are offset from the longitudinal axis defined by the main body portion.

As shown in FIGS. 16 and 17, the sealer 700 can also include a protective frame 73 as described above. The protective frame 73 is pivotally connected to the lower member 514, and is pivotable upwardly, as shown in FIG. 17. Preferably, the protective frame 73 is part of a removable frame 726 that is engaged with the lower member 514. Frame 726 has an opening 724 defined therein through which the protrusive portion 411 of the heat insulative base 41 extends when the frame 726 is secured on lower member 514. The frame 726 can be secured on lower member 514 by any known method, for example, by a friction fit, by hooks, snaps, or a screw 730 as shown in FIG. 17. Such a frame for an electric heat sealer is taught in U.S. Pat. No. 6,064,038, to Chou, filed Aug. 12, 1998, the entirety of which is incorporated herein by reference.

Figure 18:
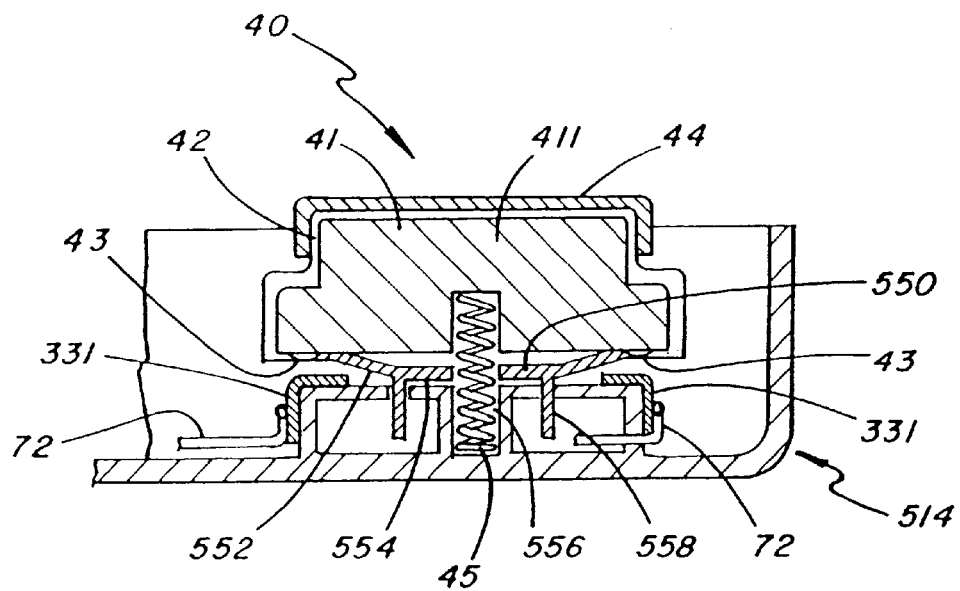
FIG. 18 is a cross-sectional elevational view taken along line 18—18 of FIG. 17, with the frame removed.
Figure 19:
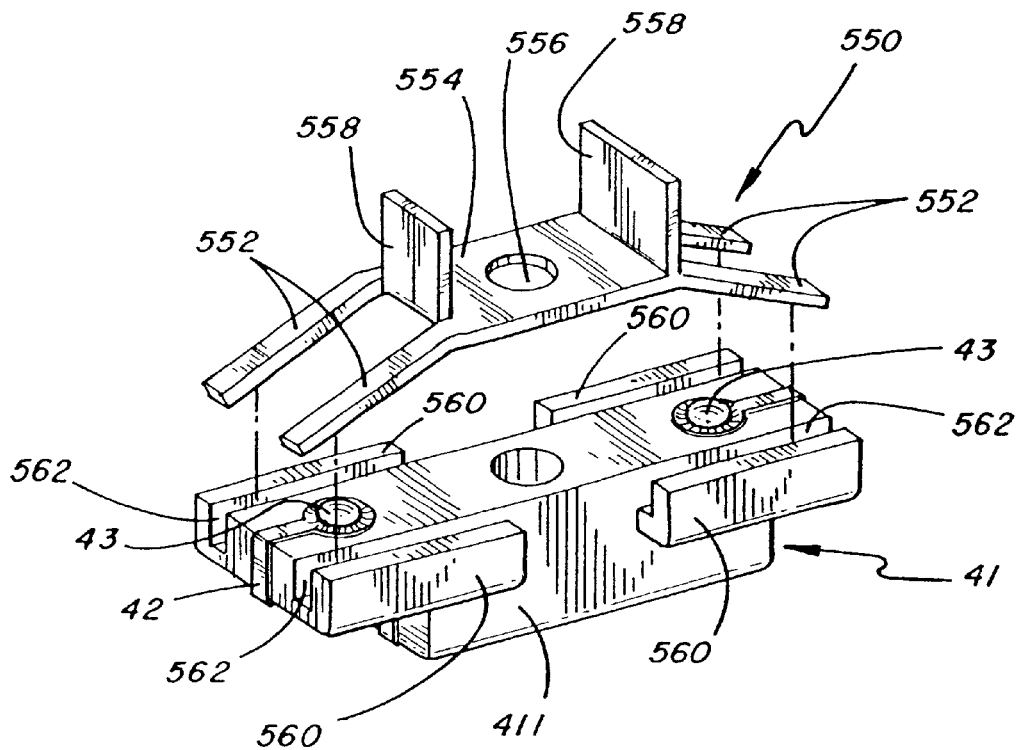
FIG. 19 is an exploded perspective view of the spring member and heat insulative base used in a preferred embodiment of the present invention.

FIG. 18 is a cross-sectional elevational view that shows a sealing mechanism 40 with a spring member 550 disposed in the lower member 514 of a sealer with an offset sealer portion. FIG. 19 shows a heat insulative base 41 and spring member 550 that can be used in a preferred embodiment of the present invention. In FIG. 19, the heat insulative base 41 and spring member 550 are shown upside down from their operative positions. The spring member 550 preferably includes four resilient arms 552 that extend angularly upwardly from a middle section 554. The middle section 554 has an opening defined therein through which a spring 45 can extend. The middle section 554 also has two support members 558 that extend downwardly therefrom, as shown in FIG. 18.

The heat insulative base 41 includes four extension portions 560 that extend from the sides thereof and define channels 562 between themselves and the main body portion 41*a* of the heat insulative base 41. The arms 552 of the spring member 550 are sized such that they can be received in the four channels 562 of the heat insulative base 41.

When assembled, the support members 558 of the spring member 550 are received in a pair of slots in the base of the lower member 514. The heat insulative base 41 rests on the spring member 550 such that the arms 552 are received in the channels 562, thereby supporting the heat insulative base 41 in a position wherein the locating plates 43 are spaced above the contact plates 331. In an alternative embodiment, the spring member 550 can be omitted and a spring 45 as described above can be used. In operation, the press bar 20 is pressed downwardly, thereby causing heat insulating cover sheet 22 to contact heat insulating cover sheet 44. The heat insulative base 41 is urged downwardly (by spring member 550 flexing), thereby causing the locating plates 43 to contact the contact plates 331 and the circuit to close.

Figure 20:
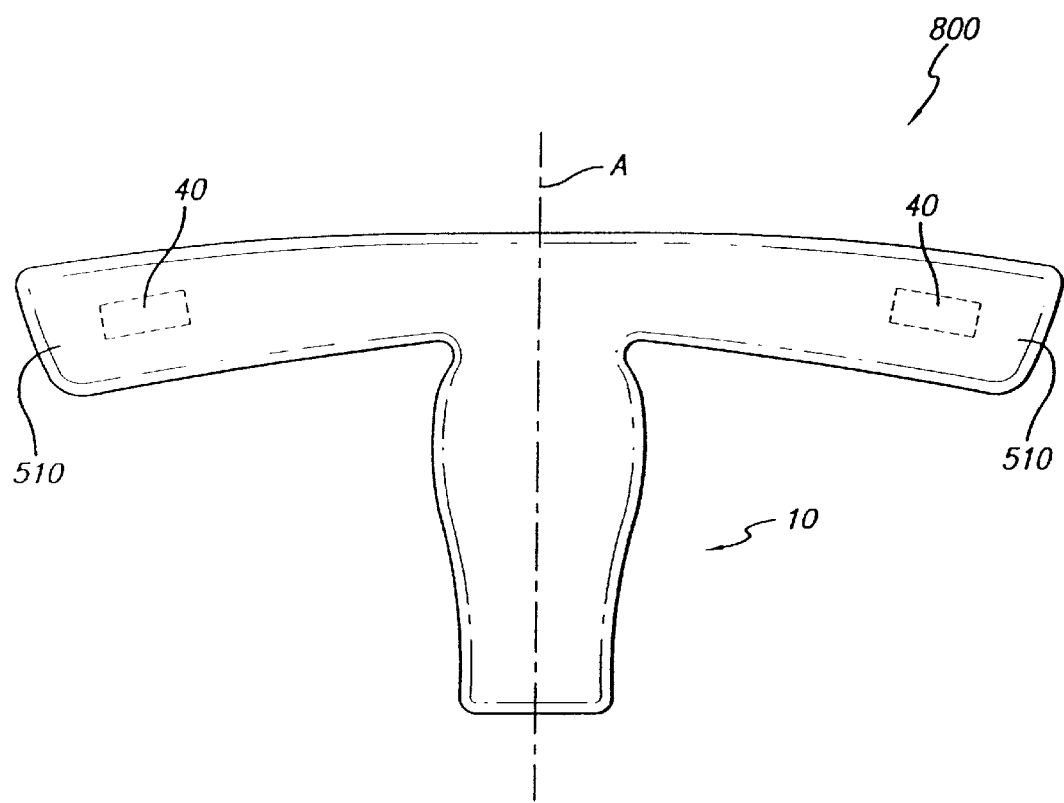
FIG. 20 is a plan view of a heat sealer having two offset sealer portions, in accordance with another embodiment of the present invention.

FIG. 20 shows another embodiment of the present invention, wherein an electric heat sealer 800, similar to those described above, includes two offset sealer portions 510, and two sealing mechanisms 40 and associated components. As shown in FIG. 18, both offset sealer portions 510 are offset from the axis A defined by the main body and casing 10 of the sealer 800.

FIGS. 21–31 show yet another embodiment of the present invention. Referring to FIGS. 21–25, in this embodiment, the heat sealer 900 includes a pair of extensions 902 and 904 that extend outwardly from the press bar 20 and the casing 10, respectively. In a preferred embodiment, the extension 902 or the press bar 20 houses a sealing mechanism 40. It will be understood that the sealing mechanism 40 can also be disposed in the casing and the extension 904 thereof. In this embodiment, the longitudinal center point C of the sealing mechanism 40 is aligned with the longitudinal axis A defined by the press bar 20 and casing 10.

Figure 23:
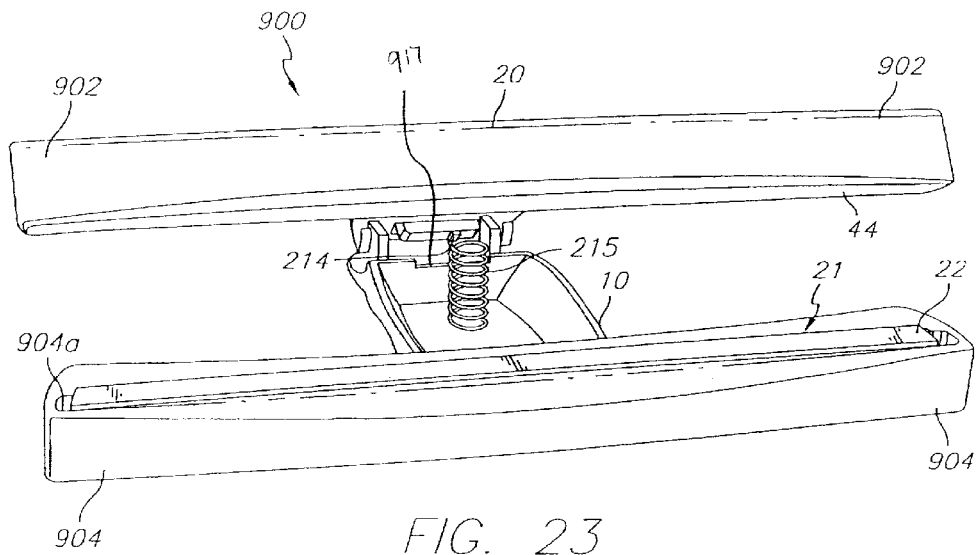
FIG. 23 is a is a perspective view of the heat sealer of FIG. 21 held in an open position to show the spring and actuation button.
Figure 25:
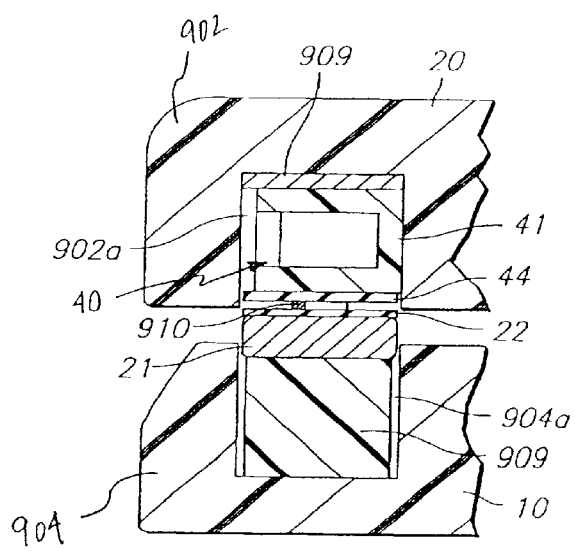
FIG. 25 is a sectional side elevation taken along line 28—28 of FIG. 21 showing the sealing mechanism and heat insulative press block mounted in the press bar and casing, respectively.

As shown in FIG. 23, the casing 10 includes a heat insulative press block 21 at one end facing the sealing mechanism 40 of the press bar 20. Preferably, the heat insulative press block 21 is covered by a heat resistant cover sheet 22. As shown in FIG. 25, in a preferred embodiment, the heat insulative press block 21 is secured to a riser 909 that is disposed in the opening 904*a* in the casing 10/extensions 904.

Figure 24:
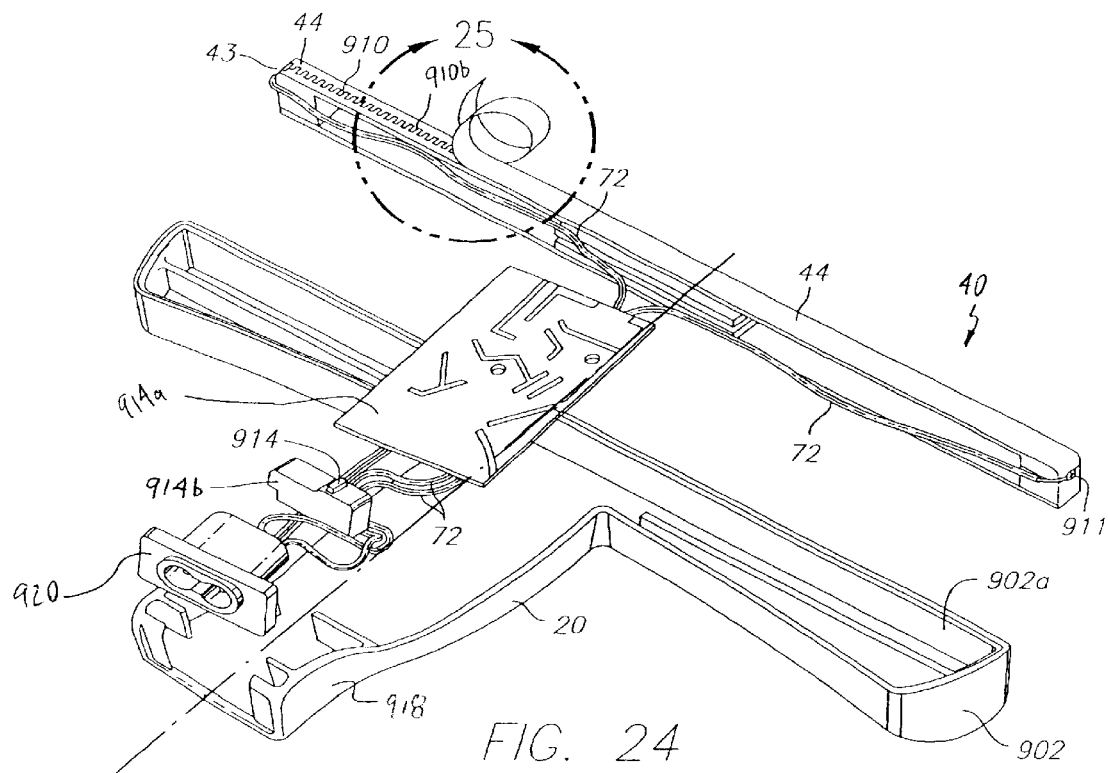
FIG. 24 is an exploded perspective view of the press bar of the heat sealer of FIG. 21.

Referring to FIGS. 24–27, the sealing mechanism 40 includes a heat insulative base 41, a heating wire 910, a heat resistant cover sheet 44 and a pair of metal locating plates or tabs 43. In a preferred embodiment, the sealing mechanism 40 includes a riser 909 to which the heat insulative base 41 is secured. The riser 909 is disposed in opening 902*a* in the press bar 20/extensions 902. The heating wire 910 is disposed on the bottom surface of the heat insulative base 41, and the heat resistant cover sheet 44 covers the heating wire 910. In another embodiment, a second heat resistant cover sheet 44 may be placed under the heating wire 910 and on top of the heat insulative base 41, as shown in FIG. 24. In one embodiment, the clips 43 are clipped onto the opposite ends of the heat insulative base 41 and hold the heating wire 910 and heat resistant cover sheet 44 in place, as shown in the figures depicting the embodiment shown in FIG. 5. The heat insulative base 41 may include a pair of notches adjacent the ends thereof, for receiving a portion of the clips 43. In another embodiment, as shown in FIG. 24, the clips 43 and/or the ends of the heating wire 910 can be secured in place by metal screws 911 or other metal elements. Electrical leads 72 can be electrically connected to the screws 911 or other element, which are electrically connected to the clips 43 and/or the heating wire 910. It will be understood that any method of securing the ends of the wire 910 and the heat resistant cover sheet 44 and including the wire 910 as part of the circuit is within the scope of the present invention.

Figure 26:
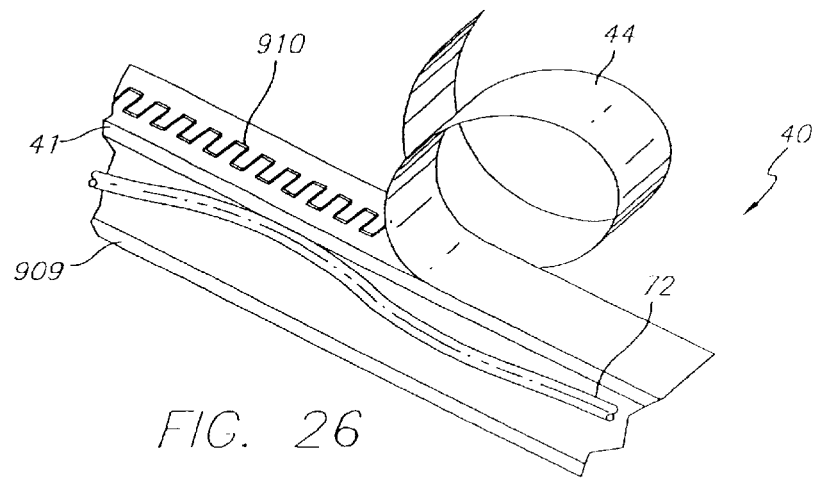
FIG. 26 is a is a perspective view of a portion of the sealing mechanism of the heat sealer of FIG. 21 with the heat resistant cover sheet peeled back to show the heating wire.
Figure 27:
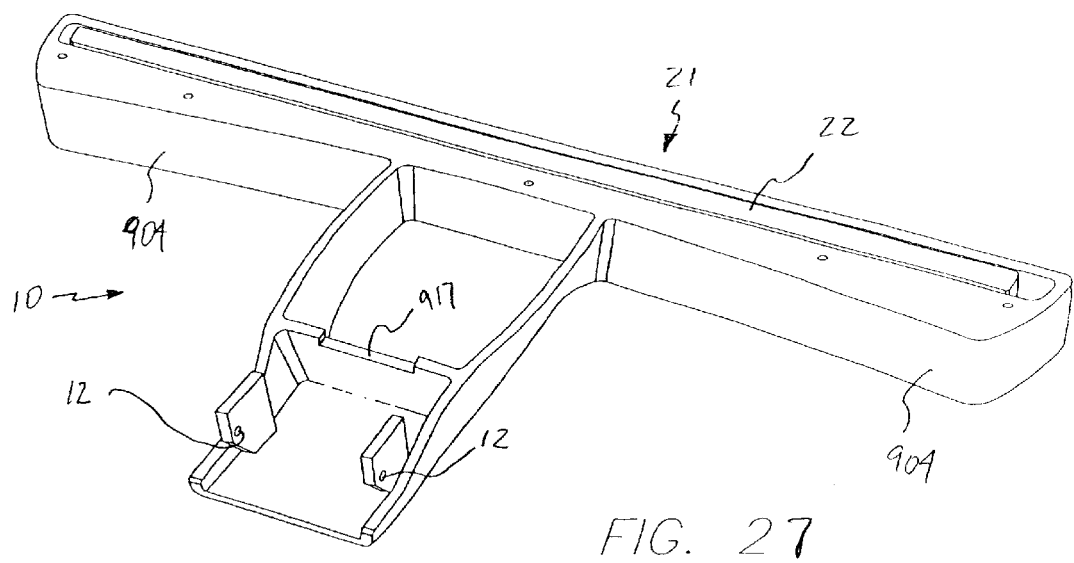
FIG. 27 is a perspective view of the casing of the heat sealer of FIG. 21.
Figure 28:
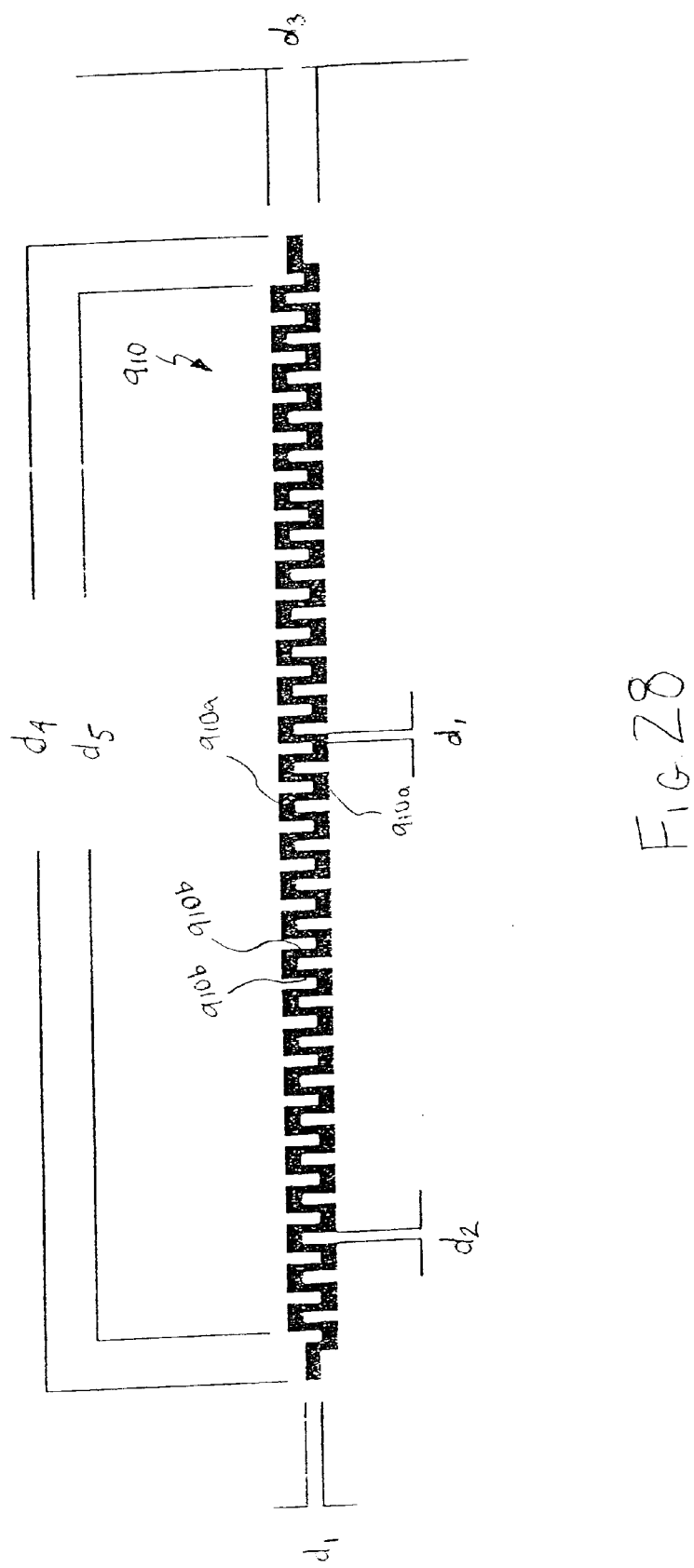
FIG. 28 is a top plan view of an electric heating wire in accordance with an embodiment of the present invention.

In this embodiment, the heating wire 910 preferably has a shape such as that shown in FIG. 28. In this shape, the heating wire 910 includes a plurality of substantially parallel horizontal sections 910a and a plurality of substantially parallel vertical sections 910b. In a preferred embodiment, the heating wire 910 (and clips 43) is cut from a sheet of metal, the majority of which is Ni—CR (Nickel-Chromium). Preferably the heating wire 910 is 99% Ni—Cr and the remaining 1% is comprised of other metals. As shown in FIG. 26, the actual heating wire 910 has a width $d_1$; the vertical sections define a space $d_2$ therebetween; the overall thickness of the heating wire configuration (from the outside edge of one parallel horizontal section to another) has a width $d_3$; the heating wire configuration has an overall length $d_4$ and a length from the outside edge of the leftmost vertical section to the outer edge of the rightmost vertical section of $d_5$. It will be understood that heating wire configuration refers to the heating wire 910 in the shape shown in FIG. 28 including the substantially parallel horizontal sections 910a and the substantially parallel vertical sections 910b.

In a preferred embodiment, $d_1$ is between approximately 0.1 mm and 0.9 mm, $d_2$ is between approximately 0.05 mm and 0.35 mm, $d_3$ is between approximately 0.05 mm and 0.35 mm, $d_4$ is between approximately 200 mm and 260 mm, and $d_5$ is between approximately 180 mm and 240 mm. In a more preferred embodiment, $d_1$ is approximately 0.5 mm, $d_2$ is approximately 0.2 mm, $d_3$ is approximately 2 mm, $d_4$ is approximately 230 mm, and $d_5$ is approximately 210 mm. It will be understood that these dimensions are merely exemplary and are not intended to be a limitation on the present invention.

With such a heating wire configuration, the entire heating wire 910 will be longer than if the heating wire was configured in a straight orientation across the heat insulative base 41, as in the above described embodiments. It will be understood that the heating wire 910 is shaped in such a configuration so that the overall length of the heating wire 910 when straight $d_7$ (not shown in the figures) is greater than the length $d_6$ of the heat insulative base 41. In otherwords, for the portion of the heating wire 910 that is disposed on the top surface 41a of the heat insulative base 41 (the sealing portion of the heating wire 910), $d_7 > d_6$. Preferably, $d_7$ is 5 times longer than $d_6$. Other heat sealers, such as the embodiments described above, have a heating wire that is straight and that runs perpendicular to the longitudinal axis defined by the casing. Other heat sealers, such as the embodiments described above, also have a heating wire that wraps around the ends of the heat insulative base, however, the sealing portion of the heating wire that is located on the top surface of the heat insulative base is less than or equal to the length of the heat insulative base. With the heating wire configuration of the present embodiment, portions of the heating wire are disposed non-perpendicular to the longitudinal axis A defined by the casing. As shown in FIG. 24, preferably, the vertical sections 910b of the heating wire 910 are disposed substantially parallel to the longitudinal axis A defined by the casing 10 and the press bar 20. However, the shape shown in FIG. 24 is not a limitation on the present invention. The wire may be shaped like a sine wave or saw-tooth wave, or may combine both. In another embodiment, the sealer may include more than one heating wire 910. The wire 910 can have any shape, provided that it affords more surface area than a single, straight, extended wire.

It will also be understood that in a preferred embodiment, the wire 910 has a non-circular cross-section. Also, the wire 910 preferable has a flat upper or contact surface. Heating wires for heat sealers, such as those described above, typically have a circular cross-section. However, this embodiment can also have a circular cross section.

In a preferred embodiment, the wire 910 has a resistance of between approximately 2 ohms and 20 ohms. In the most preferred embodiment, the wire 910 has a resistance of approximately 5 ohms. Because the heating wire configuration is wider than wires on prior electric heat sealers, a higher resistance can be used. Typical prior art heat sealers used a heating wire that had a resistance of about 5 ohms. In a preferred embodiment, heating wire 910 has a resistance of greater than 5 ohms. In a more preferred embodiment, the heating wire 910 has a resistance of between about 7 and about 30 ohms, and in a most preferred embodiment, the heating wire 910 has a resistance of about 25 ohms because the wire 910 is preferably 5 times longer ($d_7$) than prior art heating wires. In AC mode, the sealer is typically used with 120 V. As is well known in the art V (voltage)=I (current)×R (resistance) or I=V/R. Therefore, with a higher resistance, the current is lower. In the most preferred embodiment, 120 V/25 ohms=4.8 Amps. In a typical prior art sealer used in AC mode, 120 V/5 ohms=24 Amps. The lower amperage provides a more efficient burn.

Preferably, the extensions 902, 904 extend in a direction substantially perpendicular to the longitudinal axis A, however, this is not a limitation on the present invention. The sealing mechanism 40 is disposed in an opening 902a in the extension 902 of the press bar 20, and extends through opening 916a in the cover 916. In another embodiment, the sealing mechanism 40 can be disposed on the bottom in the case 10. In yet another embodiment, the press bar 20 and case 10 can both include a sealing mechanism 40.

Figure 29:
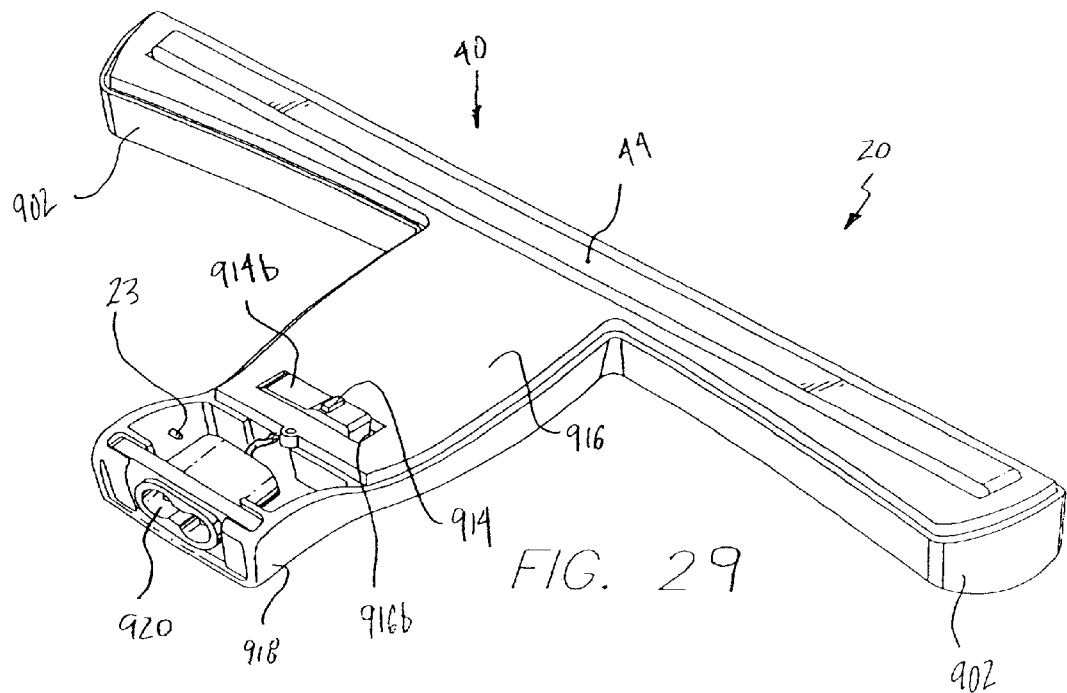
FIG. 29 is a perspective view of the press bar of the heat sealer of FIG. 21 with the cover in place.

Referring to FIGS. 22, 24 and 29, the press bar 20 includes an actuation button 914 (and associated circuitry 914a) or switch that is biased downwardly therefrom and is housed in a switch housing 914b. When the press bar 20 is moved downwardly the actuation button 914 contacts the casing 10, thereby urging the actuation button 14 upwardly and closing the circuit. In a preferred embodiment, the button 914 contacts notch 917 and is depressed. The actuation button 914 is preferably located toward the center of the press bar, and extends through opening 916b in the cover 916, as shown in FIG. 28, however this is not a limitation on the present invention.

In a preferred embodiment, the circuitry is designed so that the it is only actuated for a short period of time, for example, 2 seconds. This provides enough time to seal a plastic bag and protects the user from being burned. However, this is not a limitation on the present invention. In another embodiment, the sealer 900 can include a second switch or dial for increasing or decreasing the heating/ actuation time.

As shown in FIG. 24, and with reference to the descriptions of the other embodiments above, wires 72 electrically connect the various components of the sealer, including the actuation button 914, AC power socket 920 (described below), circuitry 914a and heating wire 910 (as well as clips 43 and/or screws 911)

The press bar 20 includes a pair of lugs 23 on the inner surface of the housing portion 918 that are inserted into two transverse pivot holes 12 at one end of the casing 10. As shown in FIG. 23, the casing 10 includes a spring 915 extending upwardly therefrom to impart an upward bias to the press bar 20. Because of the arrangement of the spring 15, the press bar 20 is normally maintained in an upward position to prevent direct contact between the heat resisting cover sheet 44 of the sealing mechanism 40 and the heat resisting cover sheet 22 of the casing 10.

When the heat sealer 900 is placed on a surface, and is at rest, the press bar 20 rests on and is biased upwardly by the spring 915. To close the circuit, the urging of the spring 915 must be overcome by pressing the press bar downwardly until the actuation button 914 contacts the casing 10. It will be understood that if the sealing mechanism 40 is in the casing 10, the placement of the spring 915, circuitry, actuation button 914, etc. will be reversed from the embodiment described above.

Referring again to FIGS. 22 and 29, the press bar 20 is preferably made of two separate pieces that are preferably formed by a molding process, a cover 916 and a housing portion 918. The cover 916 and the housing portion 918 can be secured together by any known method, such as by gluing, fastening, etc. Preferably, the cover includes clips 916c that secure the cover 916 to the housing portion 918. The portion of the cover 916 that forms part of the extensions 902 includes an opening 916a therein, through which a portion of the sealing mechanism 40 extends.

The housing portion 918 of the press bar 20 houses the electronic circuitry as shown in FIG. 22. Electric lead wires 72 extend from the circuitry to the sealing mechanism 40 to electrically connect the opposite ends of the heating wire 910 to the electric circuitry, thereby making the heating wire 910 a part of the circuit.

As is shown in FIG. 29, the sealer 900 includes a socket 920 for receiving a cord 922 (shown in FIG. 31) to electrically connect the sealer 900 with an AC power source. The cord 922 is adapted to be plugged in to a typical wall outlet, thereby providing 120 V at 60 Hz to the sealer 900.

Figure 30:
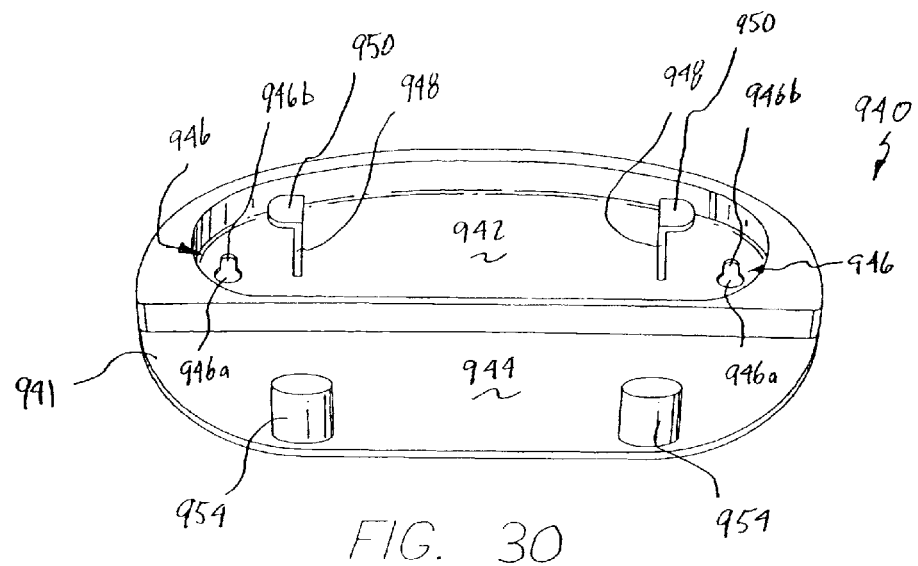
FIG. 30 is a front perspective view of a sealer wall mounting mechanism in accordance with an embodiment of the present invention.
Figure 31:
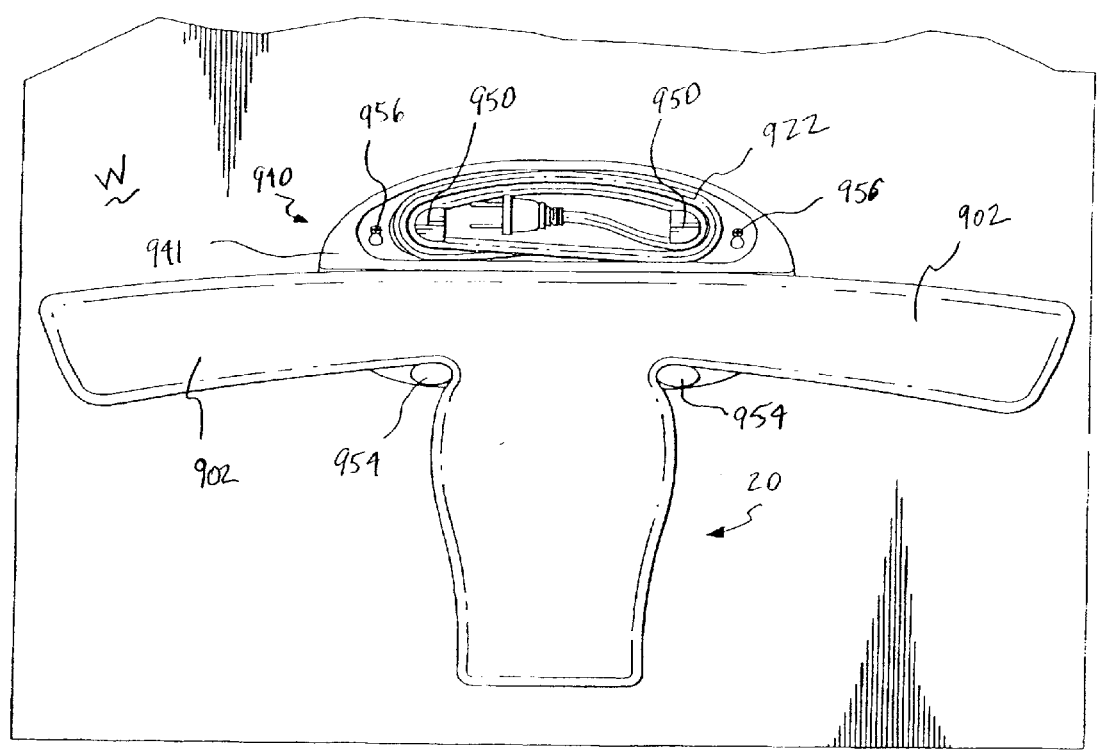
FIG. 31 is a front elevational view of the sealer of FIG. 21 mounted in the sealer wall mounting mechanism of FIG. 30, which is mounted on a wall.

As shown in FIGS. 30 and 31, a sealer wall mounting mechanism 940. The mechanism 940 includes a main body portion 941, a cord depression 942, a sealer depression 944 and a pair of openings 946 defined transversely therethrough. The cord depression 942 includes a pair of posts 948 extending outwardly therefrom around which the cord 922 can be wrapped for storage. The posts 948 can each include a tab 950 for preventing the cord from sliding off the post 948. The sealer depression 944 includes a pair of hang members 954 on which the sealer 900 can be mounted. Preferably, the hang members 954 are spaced apart so as to allow the body of the heat sealer 900 to fit therebetween and the extensions 902, 904 to rest thereon, as shown in FIG. 31. The openings 946 are used for affixing the mechanism 940 to a wall W. In a preferred embodiment, the openings 946 have a wide section 946a and a narrow section 946b. To hang the mechanism on the wall, a pair of screws 956 are screwed part way into the wall so that the head is not flush against the wall; the screw heads are inserted through the wide section 946a and the mechanism 940 is moved downwardly so that the shank of the screw 956 is received into the narrow section 946b of the opening 946, as shown in FIG. 31. In another embodiment, the openings 946 can be round. It will be understood that the mechanism 940 can be affixed to a wall W or other surface in any known manner.

It will be understood that the extensions 902 and 904 can be any desired length. Preferably, the extensions 902 and 904 extend outwardly far enough to be able to accept (and subsequently seal) a standard sized plastic bag without having to "swipe" the sealer or the bag. The sealing of a plastic bag will be described more fully hereinbelow.

It will be further understood that certain components of the various embodiments set forth above can be interchangeably used on the sealer 900. For example, the heat insulative base 41 can include a protrusive middle portion; the sealer 900 can include a cutter for slicing open sealed plastic bags; the sealer can operate on both AC and DC; the sealing mechanism 40 may be spring biased such that pressing down on the sealing mechanism 40 causes the circuit to be closed, thereby energizing the heating wire 910. The sealing mechanism can be secured in place using a frame, such that the heat resistant cover sheet 44 is easily replaceable.

The sealer 900 can also include an LED 724 (as shown in FIG. 21), similar to that described above, that indicates when the circuit is opened and closed or that indicates if the battery has power or is "dead." As will be appreciated by those skilled in the art, the above described embodiments of electric heat sealer 900 are constructed substantially the same as the sealers described above and shown in FIGS. 1–20, except that the casing 10 and press bar 20 include extensions 902 and 904 and the sealing mechanism 40 and/or heat insulative press block 21 are disposed in the extensions 902 or 904. Those skilled in the art will be able to make numerous modifications to sealer 900 on the basis of the description of the other embodiments described herein. All such embodiments are within the scope of the present invention.

Preferably, the sealer 900 is activated automatically when the press bar 20 is pressed downwardly such that the actuation button 914 contacts the casing 10 and closes the circuit as described above. The sealer 900 can also include a safety switch 71 as described above. When the safety switch 71 is at an "off" position, the heating wire 910 cannot be activated even when the circuit is closed by pressing down the press bar as described above. When the safety switch 71 is in the "on" position, the heating wire 910 is energized when the circuit is closed by urging the actuation button 914 into a closed position. In an alternative embodiment, the electric heating wire 910 can be energized simply by switching safety switch 71 to the "on" position. In this embodiment, actuation button 914 can be omitted. Electric current can be supplied to the electric heating wire 910 of the sealer 900 by AC or DC power as described above.

The embodiments of the present invention recited herein are intended to be merely exemplary and those skilled in the art will be able to make numerous modifications to them without departing from the spirit of the present invention. For example, the sealing mechanism, and in particular, the electric heating wire can be shortened to provide a longer battery life. In this alternative embodiment, the electric heating wire can be less than 1.0" in length. Preferably, the electric heating wire is less than 0.75" in length, and more preferably the electric heating wire is less than 0.50" in length. The shorter the electric heating wire is, the longer the batteries will last. The electric heating wire can be made of a non-ferrous material, such as copper or any other type of material to improve battery life. All such modifications are intended to be within the scope of the present invention as defined by the claims appended hereto.

What is claimed is:

1. An electric heat sealer comprising:
   (a) a casing, wherein said casing includes a first extension extending outwardly therefrom,
   (b) a press bar pivotally connected to said casing, wherein said press bar includes a second extension extending outwardly therefrom, and wherein said press bar is normally biased above said casing,
- (c) at least one sealing mechanism mounted in said first extension or said second extension, wherein said at least one sealing mechanism includes a heating wire,
- (d) a source of current for energizing said heating wire, and
- (e) a spring member configured to close a circuit and allow said source of current to energize and heating wire when said at least one sealing mechanism is engaged with an item to be sealed.

2. The electric heat sealer of claim 1 wherein said sealing mechanism is disposed in said second extension.

3. The electric heat sealer of claim 1 wherein said sealing mechanism is disposed in said first extension.

4. The electric heat sealer of claim 1 wherein a first sealing mechanism is disposed in said first extension, and a second sealing mechanism is disposed in said second extension.

5. The electric heat sealer of claim 1 which is adapted to be supplied with electrical current from at least one current source selected from the group consisting of a DC current source and an AC current source.

6. The electric heat sealer of claim 1 wherein said casing defines a longitudinal axis, and wherein at least a portion of said heating wire is oriented non-perpendicularly to said longitudinal axis.

7. The electric heat sealer of claim 1 wherein said casing defines a longitudinal axis, and wherein at least a portion of said heating wire is oriented substantially parallel to said longitudinal axis.

8. The electric heat sealer of claim 1 wherein said heating wire includes at least two sections that are not parallel to one another.

9. The electric heat sealer of claim 1 wherein said heating wire includes at least two sections that are substantially perpendicular to one another.

10. The electric heat sealer of claim 1 wherein said sealing mechanism further includes a heat insulative base having a top surface on which said heating wire is disposed, wherein the portion of said heating wire disposed on said top surface is longer than the length of said top surface.

11. The electric heat sealer of claim 1 wherein the resistance of said wire is greater than about 5 ohms.

12. The electric heat sealer of claim 11 wherein said casing defines a longitudinal axis, and wherein said extensions extend in a direction substantially perpendicular to said longitudinal axis.

13. The electric heat sealer of claim 1 further comprising an actuation button, wherein said source of current is electrically connected to said heating wire when said actuation button is depressed.

14. The electric heat sealer of claim 13 wherein said actuation button is located in a position such that it is depressed when the press bar is pressed downwardly.

15. The electric heat sealer of claim 1 wherein said sealing mechanism is movable up and down to electrically connect said source of current to said heating wire.

16. The electric heat sealer of claim 1 wherein said heating wire has a non-circular cross-section.

17. The electric heat sealer of claim 1 wherein said heating wire comprises at least two horizontal sections that are substantially parallel and at least two vertical sections that are substantially parallel, and wherein said at least two horizontal sections and said at least two vertical sections are substantially perpendicular to one another.

18. A sealing kit comprising:
- (a) a sealer wall mounting mechanism comprising
   - (i) a main body portion
   - (ii) a pair of spaced apart posts extending outwardly from said main body portion,
   - (iii) a pair of spaced apart hang members extending outwardly from said main body portion and spaced below said pair of spaced apart posts,
   - (iv) a cord storage depression, and
- (b) a sealer comprising a casing with an extension extending outwardly therefrom wherein said sealer is mounted on said hang members, whereby said casing extends between said hang members, and said extensions rest on one of said hang members.

19. An electric heat sealer comprising:
- (a) a casing,
- (b) a press bar pivotally connected to said casing,
- (c) at least one sealing mechanism mounted within said casing or said press bar, said sealing mechanism including a heating wire, wherein said heating wire has a resistance of greater than about 5 ohms,
- (d) a source of current, and
- (e) a spring member configured to close a circuit and allow said source of current to energize said heating wire when said at least one sealing mechanism is engaged with an item to be sealed.

20. The sealer of claim 19 wherein the resistance of said heating wire is between about 7 ohms and about 30 ohms.

21. The sealer of claim 19 wherein the resistance of said heating wire is between about 20 ohms and about 25 ohms.

* * * * *